(12) United States Patent
Watanabe

(10) Patent No.: US 12,462,977 B2
(45) Date of Patent: Nov. 4, 2025

(54) MULTILAYER CERAMIC ELECTRONIC COMPONENT INCLUDING VIA CONDUCTORS NOT EXPOSED TO PRINCIPAL SURFACES

(71) Applicant: Murata Manufacturing Co., Ltd., Nagaokakyo (JP)

(72) Inventor: Yukie Watanabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 352 days.

(21) Appl. No.: 18/124,015

(22) Filed: Mar. 21, 2023

(65) Prior Publication Data
US 2023/0317372 A1 Oct. 5, 2023

(30) Foreign Application Priority Data
Apr. 5, 2022 (JP) .................................. 2022-063100

(51) Int. Cl.
*H01G 4/005* (2006.01)
*H01C 1/148* (2006.01)
*H01C 7/00* (2006.01)
*H01C 7/18* (2006.01)
*H01G 4/232* (2006.01)
(Continued)

(52) U.S. Cl.
CPC ............. *H01G 4/005* (2013.01); *H01C 1/148* (2013.01); *H01C 7/008* (2013.01); *H01C 7/18* (2013.01); *H01G 4/232* (2013.01); *H01G 4/248* (2013.01); *H01G 4/30* (2013.01)

(58) Field of Classification Search
CPC ........ H01G 4/005; H01G 4/232; H01G 4/248; H01G 4/30; H01G 4/1227; H01G 4/0085; H01G 4/012; H01G 4/12; H01C 1/148; H01C 7/008; H01C 7/18; H01C 1/142
See application file for complete search history.

(56) References Cited

U.S. PATENT DOCUMENTS

2004/0022009 A1 2/2004 Galvagni et al.
2004/0197973 A1 10/2004 Ritter et al.
(Continued)

FOREIGN PATENT DOCUMENTS

JP 06-176965 A 6/1994
JP 7-297080 A 11/1995
(Continued)

*Primary Examiner* — Timothy J. Dole
*Assistant Examiner* — Daniel M Dubuisson
(74) *Attorney, Agent, or Firm* — Keating & Bennett, LLP

(57) ABSTRACT

In a multilayer ceramic electronic component, a first auxiliary electrode layer spaced away from a second internal electrode layer and exposed to a first end surface is on a same plane as a ceramic layer on which the second internal electrode layer is located, a second auxiliary electrode layer spaced away from a first internal electrode layer and exposed to a second end surface is on a same plane as the ceramic layer on which the first internal electrode layer is located, a first via conductor is at a central portion in a width direction of the first internal electrode layer and the first auxiliary electrode layer and exposed to the first end surface, and a second via conductor is at a central portion in a width direction of the second internal electrode layer and the second auxiliary electrode layer and exposed to the second end surface.

20 Claims, 19 Drawing Sheets

(51) Int. Cl.
    *H01G 4/248*    (2006.01)
    *H01G 4/30*     (2006.01)

(56)            References Cited

U.S. PATENT DOCUMENTS

| | | |
|---|---|---|
| 2004/0264105 A1 | 12/2004 | Galvagni et al. |
| 2009/0126174 A1 | 5/2009 | Hong et al. |
| 2012/0019978 A1 | 1/2012 | Yoshida |
| 2013/0242462 A1* | 9/2013 | Kawano ............... H01G 4/1227 |
| | | 361/321.1 |
| 2015/0021080 A1 | 1/2015 | Lee et al. |
| 2017/0323725 A1* | 11/2017 | Iso ........................ H01F 27/292 |
| 2018/0019064 A1 | 1/2018 | Han et al. |
| 2018/0090275 A1* | 3/2018 | Lee ........................ H01G 4/232 |
| 2018/0218840 A1* | 8/2018 | Watabe .................. H01G 4/232 |
| 2020/0043666 A1* | 2/2020 | Kim ........................ H01G 4/30 |
| 2022/0028618 A1* | 1/2022 | Kato ........................ H01G 4/30 |

FOREIGN PATENT DOCUMENTS

| | | |
|---|---|---|
| JP | 11-135356 A | 5/1999 |
| JP | 11-317323 A | 11/1999 |
| JP | 2001-044068 A | 2/2001 |
| JP | 2004-040085 A | 2/2004 |
| JP | 2009-124155 A | 6/2009 |
| JP | 2014-086680 A | 5/2014 |
| JP | 2015-154044 A | 8/2015 |
| JP | 2016-058753 A | 4/2016 |
| JP | 2018-011047 A | 1/2018 |
| JP | 2020-136363 A | 8/2020 |
| KR | 20120018715 A | 3/2012 |
| KR | 20160071610 A | 6/2016 |
| KR | 20180007865 A | 1/2018 |

\* cited by examiner

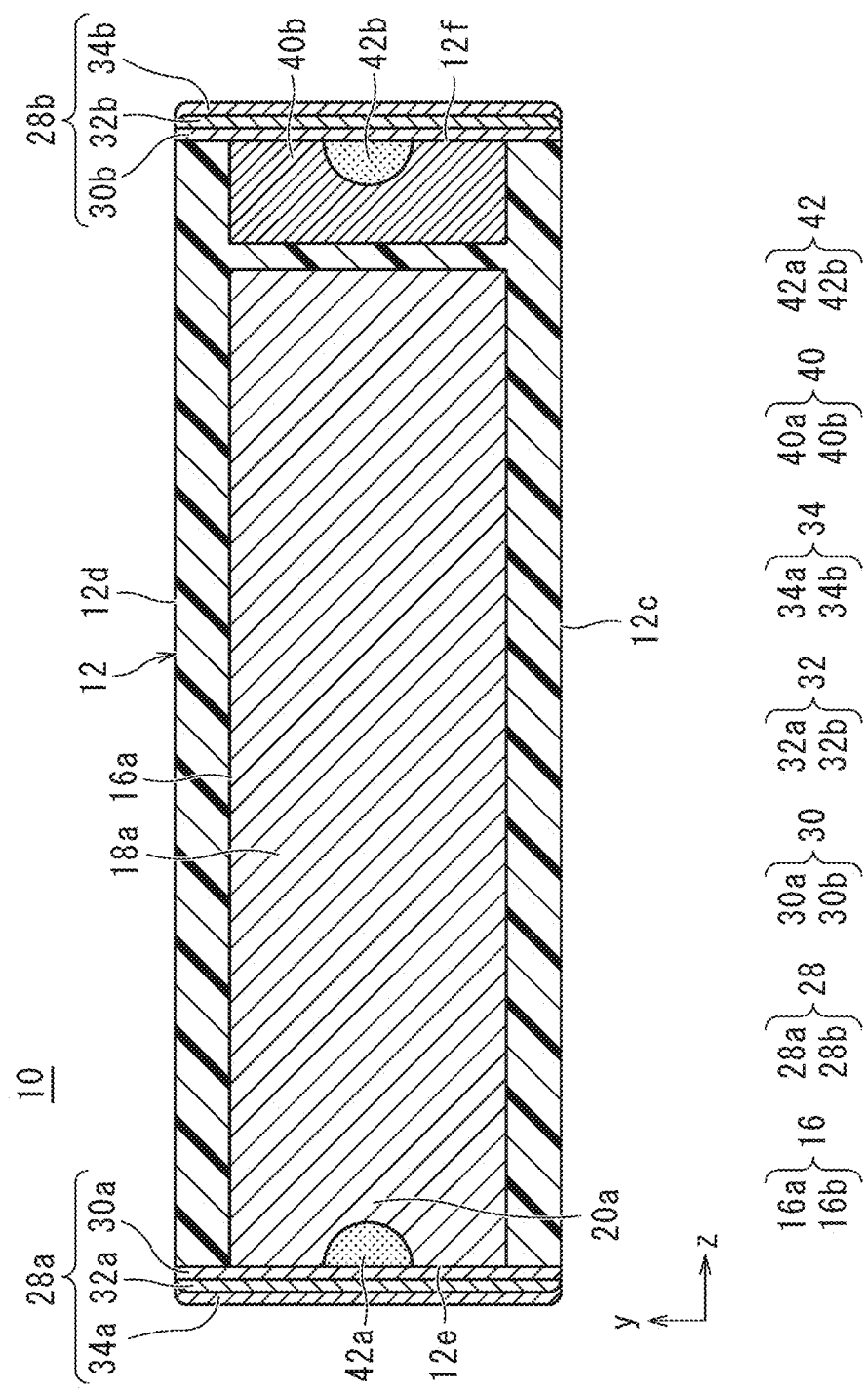

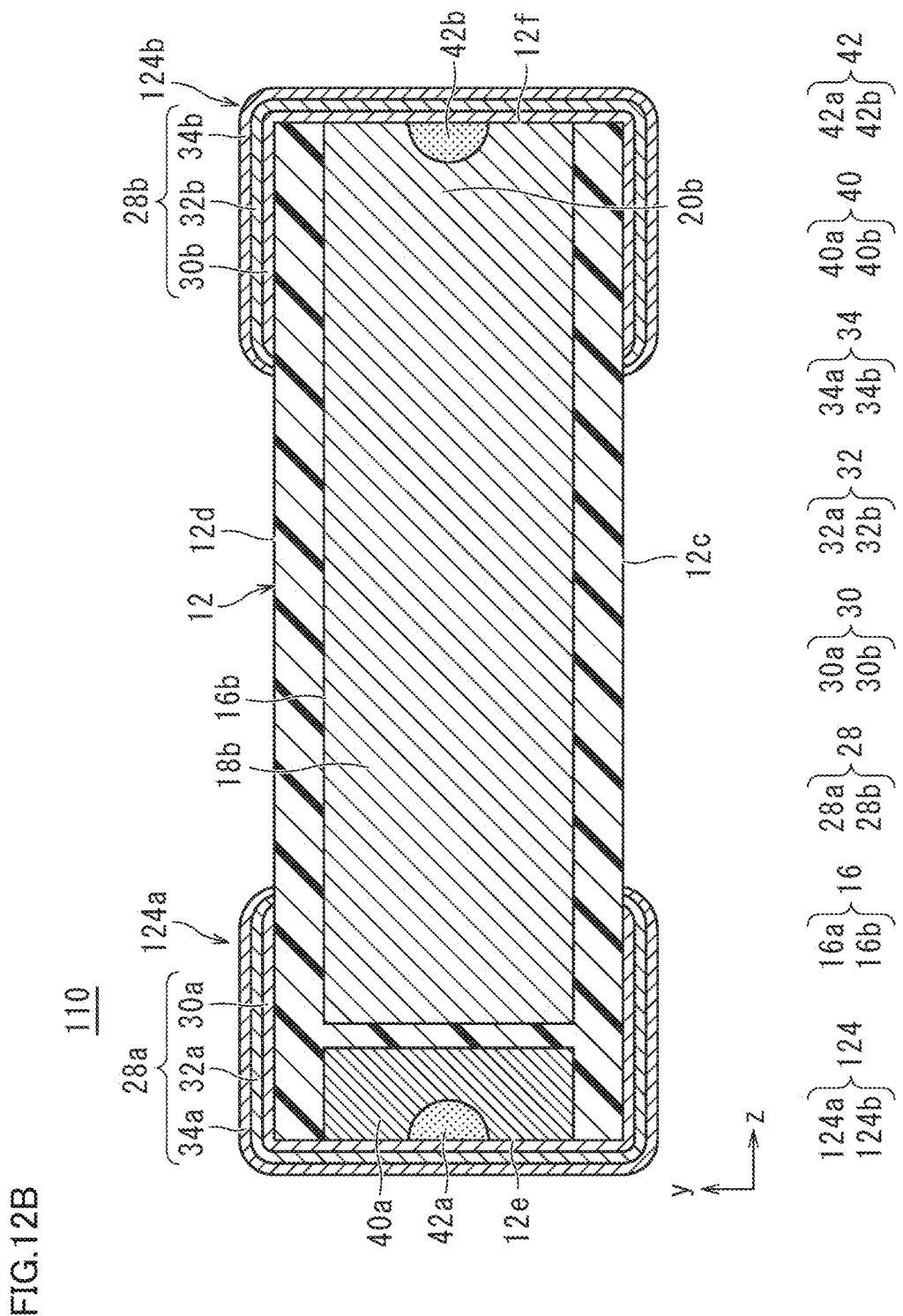

MULTILAYER CERAMIC ELECTRONIC COMPONENT INCLUDING VIA CONDUCTORS NOT EXPOSED TO PRINCIPAL SURFACES

CROSS REFERENCE TO RELATED APPLICATIONS

This application claims the benefit of priority to Japanese Patent Application No. 2022-063100 filed on Apr. 5, 2022. The entire contents of this application are hereby incorporated herein by reference.

BACKGROUND OF THE INVENTION

1. Field of the Invention

The present invention relates to a multilayer ceramic electronic component.

2. Description of the Related Art

In recent years, electronic devices such as mobile phones and portable music players have been reduced in size and thickness. Accordingly, multilayer ceramic electronic components mounted in downsized and thinned electronic devices have also been reduced in size and thickness.

Multilayer ceramic electronic components which are particularly reduced in thickness have been incorporated and used in a wiring substrate, or have been mounted in an extremely narrow space when being mounted on the surface of a wiring substrate. As the thickness of the multilayer ceramic electronic component decreases as described above, the mechanical strength of the multilayer ceramic electronic component decreases, and thus, it is strongly required to ensure the mechanical strength.

For example, Japanese Patent Laying-Open No. 2020-136363 discloses a multilayer ceramic electronic component having a structure in which: a ceramic body (multilayer body) has a principal surface oriented in a first direction, an end surface oriented in a second direction orthogonal to the first direction, and a lateral surface oriented in a third direction orthogonal to the first direction and the second direction; multiple internal electrodes are laminated in the first direction; an external electrode has a plating film, the external electrode covering the end surface and extending to a part of the lateral surface and the principal surface; the plating film includes a principal surface region oriented in the first direction, an end surface region oriented in the second direction, and a lateral surface region oriented in the third direction; and the film thickness of the end surface region or the lateral surface region is larger than the film thickness of the principal surface region.

SUMMARY OF THE INVENTION

However, the structure described in Japanese Patent Laying-Open No. 2020-136363 cannot keep sufficient mechanical strength when the thickness dimension of the multilayer ceramic electronic component decreases, and thus, cannot suppress cracks and flaws.

In addition, when barrel polishing is performed on a multilayer body which has not been fired or which has already been fired in order to expose an internal electrode to an end surface of the multilayer body in a method for manufacturing a multilayer ceramic electronic component according to a known technique, the multilayer body which has not been fired or which has already been fired is damaged, and particularly when the thickness dimension of the multilayer ceramic electronic component is small, the multilayer ceramic electronic component is greatly affected and may have cracks and flaws.

Preferred embodiments of the present invention provide multilayer ceramic electronic components each capable of improving mechanical strength even if the multilayer ceramic electronic component has a low profile.

A multilayer ceramic electronic component according to a preferred embodiment of the present invention includes a multilayer body including a plurality of ceramic layers that are laminated and a plurality of internal electrode layers laminated on the ceramic layers, the multilayer body including a first principal surface and a second principal surface facing each other in a lamination direction, a first lateral surface and a second lateral surface facing each other in a width direction orthogonal to the lamination direction, and a first end surface and a second end surface facing each other in a length direction orthogonal to the lamination direction and the width direction, and a plurality of external electrodes connected to the internal electrode layers, in which the multilayer body includes an inner layer portion including a region from an internal electrode layer located closest to the first principal surface among the plurality of internal electrode layers to an internal electrode layer located closest to the second principal surface among the plurality of internal electrode layers, the plurality of internal electrode layers facing each other with the ceramic layers interposed therebetween in the lamination direction, a first principal surface-side outer layer portion including the plurality of ceramic layers located between the first principal surface and the internal electrode layer located closest to the first principal surface among the plurality of internal electrode layers, and a second principal surface-side outer layer portion including the plurality of ceramic layers located between the second principal surface and the internal electrode layer located closest to the second principal surface among the plurality of internal electrode layers, the internal electrode layers include a first internal electrode layer exposed to the first end surface, and a second internal electrode layer exposed to the second end surface, a first auxiliary electrode layer spaced away from the second internal electrode layer and exposed to the first end surface is on a same plane as the ceramic layer on which the second internal electrode layer is located, a second auxiliary electrode layer spaced away from the first internal electrode layer and exposed to the second end surface is on a same plane as the ceramic layer on which the first internal electrode layer is located, a first via conductor is at a central portion in the width direction of the first internal electrode layer and the first auxiliary electrode layer so as to be exposed to the first end surface, and a second via conductor is at a central portion in the width direction of the second internal electrode layer and the second auxiliary electrode layer so as to be exposed to the second end surface.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5A is a cross-sectional view taken along line VA-VA in FIG. 4.

FIG. 12B is a cross-sectional view taken along line XIIB-XIIB in FIG. 11.

DETAILED DESCRIPTION OF THE PREFERRED EMBODIMENTS

Multilayer ceramic capacitors will be described below as examples of multilayer ceramic electronic components according to preferred embodiments of the present invention.

A. First Preferred Embodiment

1. Multilayer Ceramic Capacitor

Figure 1:
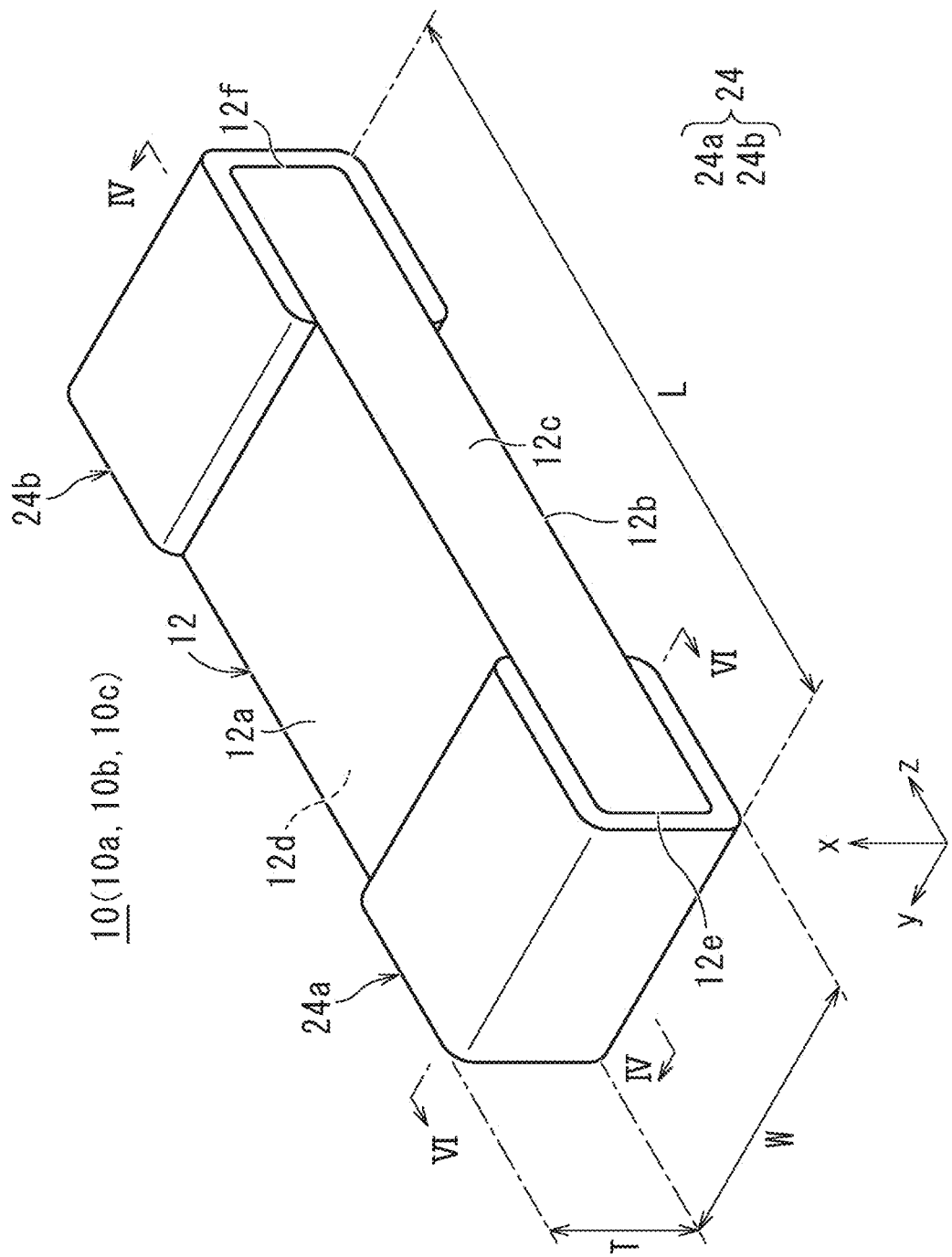
FIG. 1 is an external perspective view illustrating a multilayer ceramic capacitor as an example of a multilayer ceramic electronic component according to a first preferred embodiment of the present invention.
Figure 2:
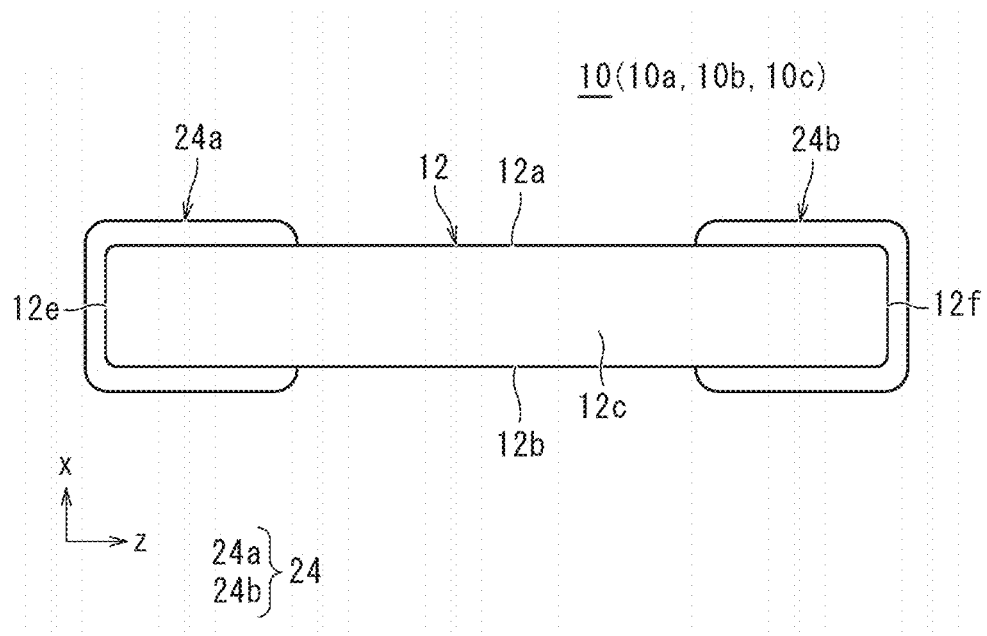
FIG. 2 is a front view illustrating the multilayer ceramic capacitor as an example of the multilayer ceramic electronic component according to the first preferred embodiment of the present invention.
Figure 3:
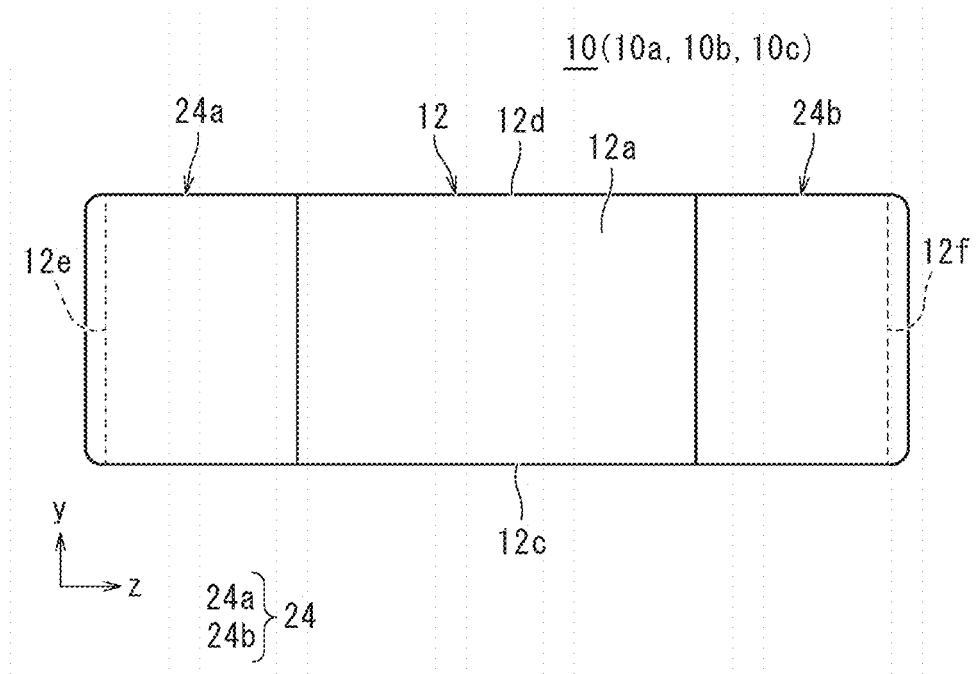
FIG. 3 is a top view illustrating the multilayer ceramic capacitor as an example of the multilayer ceramic electronic component according to the first preferred embodiment of the present invention.
Figure 4:
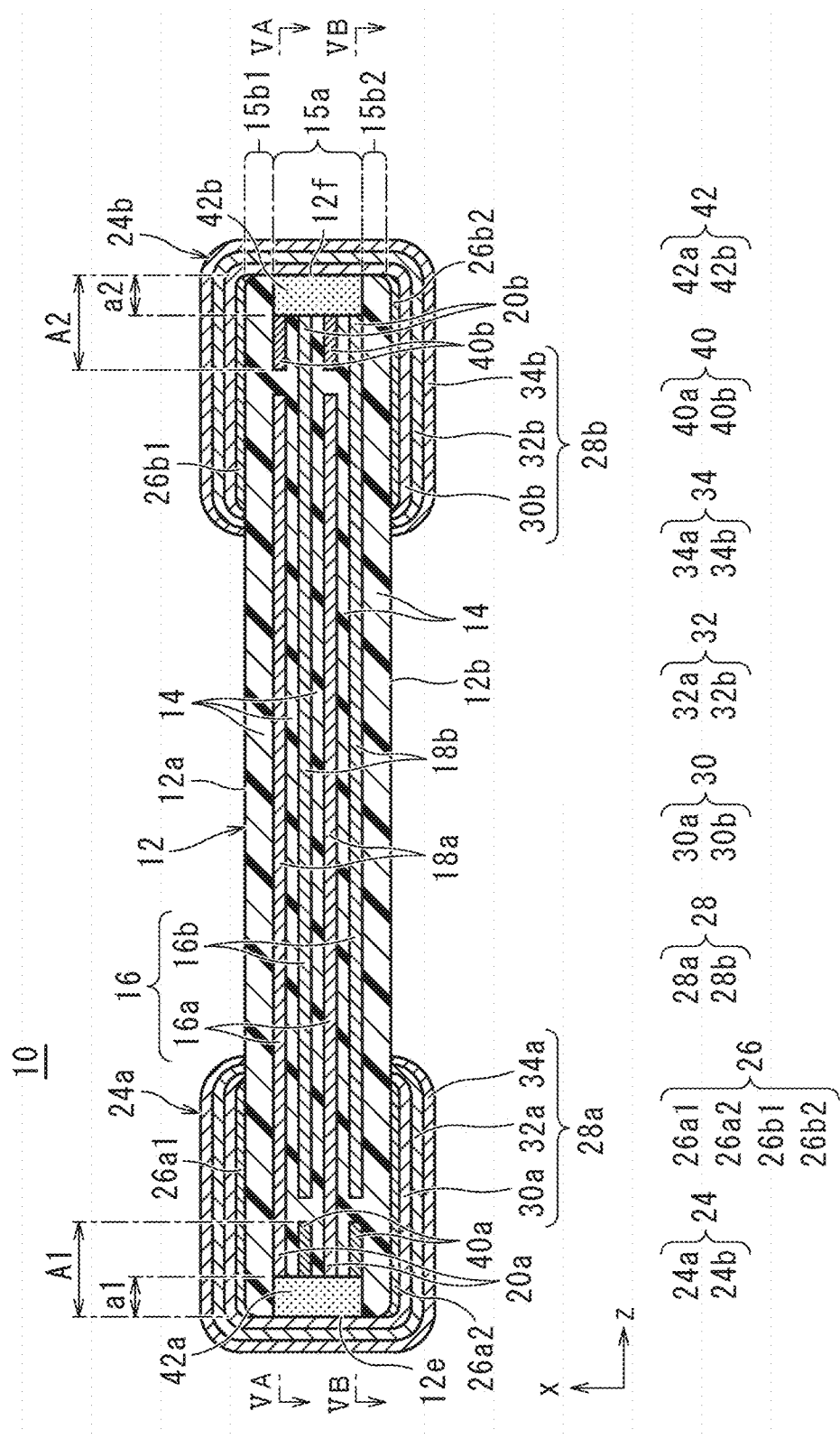
FIG. 4 is a cross-sectional view taken along line IV-IV in FIG. 1.
Figure 5B:
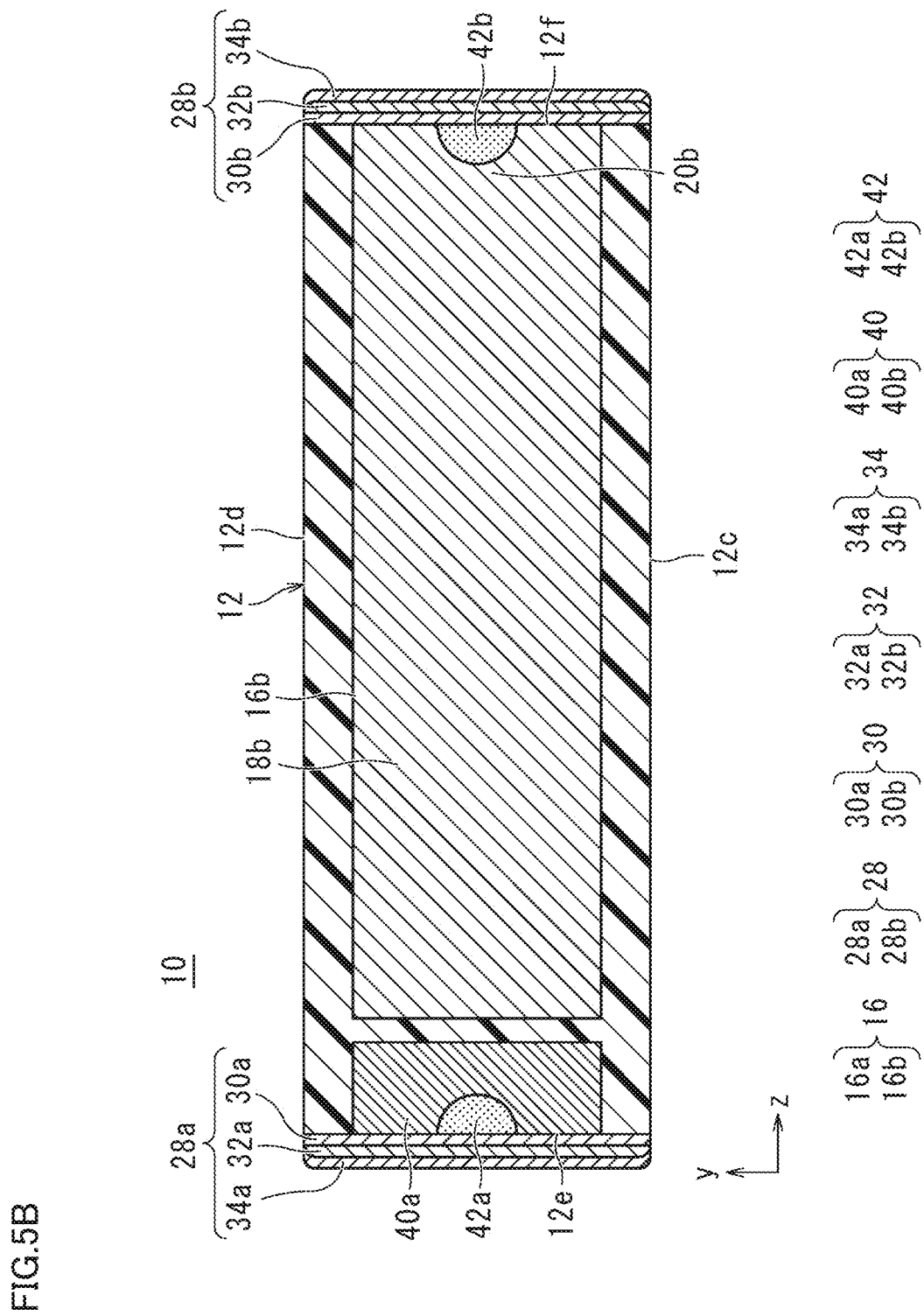
FIG. 5B is a cross-sectional view taken along line VB-VB in FIG. 4.
Figure 6:
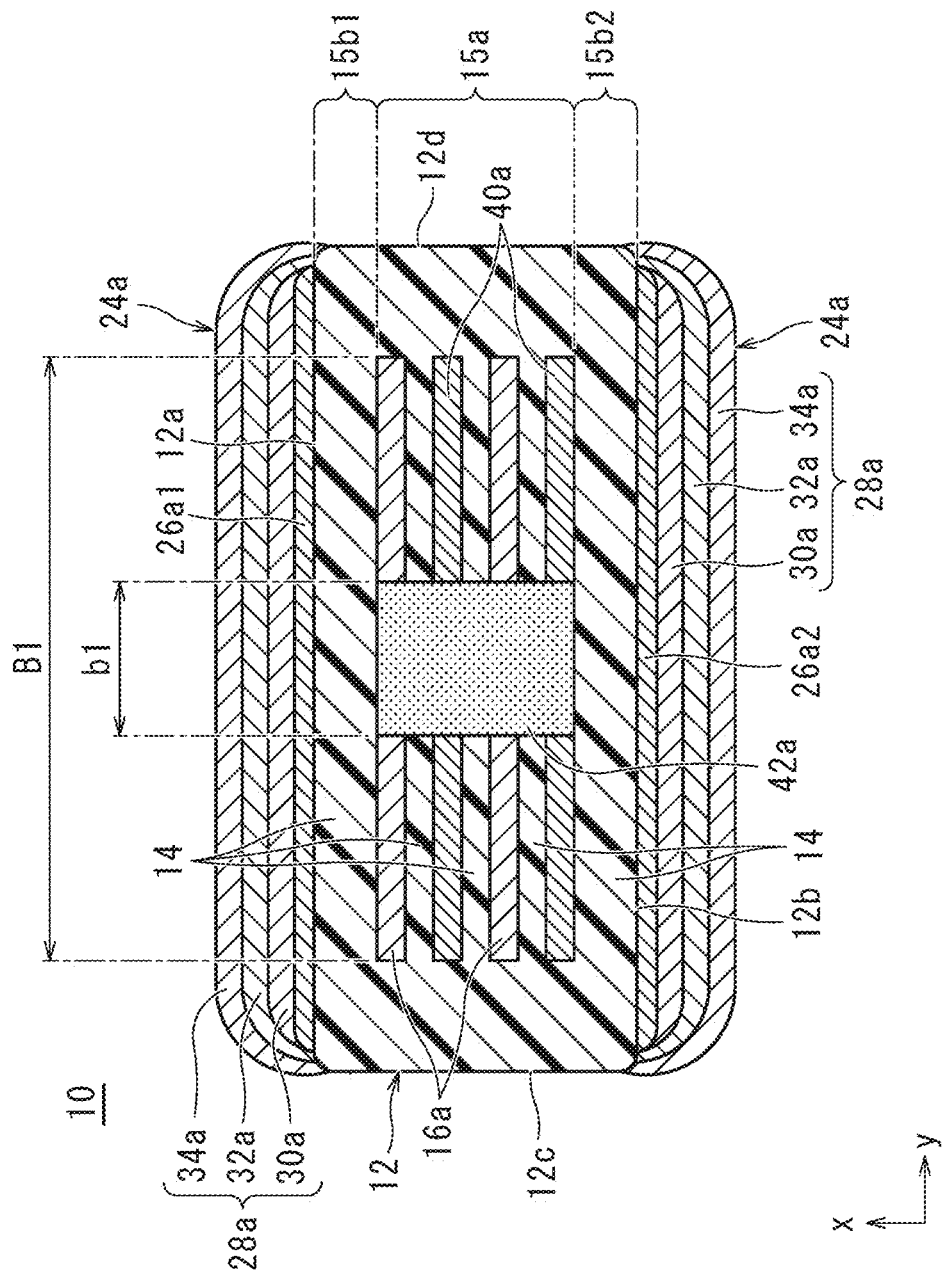
FIG. 6 is a cross-sectional view taken along line VI-VI in FIG. 1.

A multilayer ceramic capacitor 10 as an example of the multilayer ceramic electronic component according to the first preferred embodiment of the present invention will be described. FIG. 1 is an external perspective view illustrating the multilayer ceramic capacitor as an example of the multilayer ceramic electronic component according to the first preferred embodiment of the present invention. FIG. 2 is a front view illustrating the multilayer ceramic capacitor as an example of the multilayer ceramic electronic component according to the first preferred embodiment of the present invention. FIG. 3 is a top view illustrating the multilayer ceramic capacitor as an example of the multilayer ceramic electronic component according to the first preferred embodiment of the present invention. FIG. 4 is a cross-sectional view taken along line IV-IV in FIG. 1. FIG. 5A is a cross-sectional view taken along line VA-VA in FIG. 4. FIG. 5B is a cross-sectional view taken along line VB-VB in FIG. 4. FIG. 6 is a cross-sectional view taken along line VI-VI in FIG. 1.

Multilayer ceramic capacitor 10 includes a multilayer body 12 including multiple ceramic layers 14 which are laminated and multiple internal electrode layers 16 which are laminated on ceramic layers 14, multilayer body 12 having a first principal surface 12a and a second principal surface 12b facing each other in a lamination direction x, a first lateral surface 12c and a second lateral surface 12d facing each other in a width direction y orthogonal to lamination direction x, and a first end surface 12e and a second end surface 12f facing each other in a length direction z orthogonal to lamination direction x and width direction y, and multiple external electrodes 24 connected to internal electrode layers 16.

A dimension in length direction z of multilayer ceramic capacitor 10 including multilayer body 12 and external electrodes 24 is defined as an L dimension. L dimension is preferably greater than or equal to about 0.2 mm and less than or equal to about 10 mm, for example. A dimension in width direction y of multilayer ceramic capacitor 10 including multilayer body 12 and external electrodes 24 is defined as a W dimension. W dimension is preferably greater than or equal to about 0.1 mm and less than or equal to about 10 mm, for example. A dimension in lamination direction x of multilayer ceramic capacitor 10 including multilayer body 12 and external electrodes 24 is defined as a T dimension. T dimension is preferably less than or equal to about 150 μm, and more preferably less than or equal to about 80 μm, for example. In particular, in the present preferred embodiment, the effect of the present invention is more exhibited as T dimension of multilayer ceramic capacitor 10 in lamination direction x is smaller. This is because the mechanical strength of multilayer ceramic capacitor 10 decreases as T dimension of multilayer ceramic capacitor 10 decreases.

Multilayer Body

Multilayer body 12 has laminated multiple ceramic layers 14 and multiple internal electrode layers 16. Multilayer body 12 further includes first principal surface 12a and second principal surface 12b facing each other in lamination direction x, first lateral surface 12c and second lateral surface 12d facing each other in width direction y orthogonal to lamination direction x, and first end surface 12e and second end surface 12f facing each other in length direction z orthogonal to lamination direction x and width direction y. Multilayer body 12 includes corners and ridges which are rounded. Note that the corner is a portion where three adjacent surfaces of multilayer body 12 meet, and the ridge is a portion where two adjacent surfaces of multilayer body 12 meet. In addition, irregularities or the like may be formed on a part or all of first principal surface 12a, second principal surface 12b, first lateral surface 12c, second lateral surface 12d, first end surface 12e, and second end surface 12f.

Multilayer body 12 includes an inner layer portion 15a which includes a region from internal electrode layer 16 located closest to first principal surface 12a among multiple internal electrode layers 16 to internal electrode layer 16 located closest to second principal surface 12b among multiple internal electrode layers 16 in lamination direction x, multiple internal electrode layers 16 facing each other with ceramic layers 14 therebetween, a first principal surface-side outer layer portion 15b1 that includes multiple ceramic layers 14 located between first principal surface 12a and internal electrode layer 16 located closest to first principal surface 12a among multiple internal electrode layers 16, and a second principal surface-side outer layer portion 15b2 that includes multiple ceramic layers 14 located between second principal surface 12b and internal electrode layer 16 located closest to second principal surface 12b among multiple internal electrode layers 16.

First principal surface-side outer layer portion 15b1 is located on first principal surface 12a side of multilayer body 12, and is an aggregate of multiple ceramic layers 14 located between first principal surface 12a and internal electrode layer 16 closest to first principal surface 12a.

Second principal surface-side outer layer portion 15b2 is located on second principal surface 12b side of multilayer body 12, and is an aggregate of multiple ceramic layers 14 located between second principal surface 12b and internal electrode layer 16 closest to second principal surface 12b.

A region sandwiched between first principal surface-side outer layer portion 15b1 and second principal surface-side outer layer portion 15b2 is inner layer portion 15a.

The number of ceramic layers 14 to be laminated is not particularly limited, but is preferably greater than or equal to 4 and less than or equal to 200, including first principal surface-side outer layer portion 15b1 and second principal surface-side outer layer portion 15b2. The thickness of ceramic layer 14 is preferably greater than or equal to about 0.3 μm and less than or equal to about 15 μm, for example.

Ceramic layers 14 can be made of, for example, a dielectric material. Usable examples of the dielectric material include a dielectric ceramic having $BaTiO_3$, $CaTiO_3$, $SrTiO_3$, $CaZn_3$, or the like as a main component. In addition, a material obtained by adding accessory components such as a Mn compound, an Fe compound, a Cr compound, a Co compound, and a Ni compound to these main components may be used.

The dimension of multilayer body 12 is not particularly limited, but the dimension obtained by excluding the thickness of external electrodes 24 from the dimension of multilayer ceramic capacitor 10 in the present preferred embodiment is the dimension of multilayer body 12. In particular, in the present preferred embodiment, a greater effect is produced for multilayer body 12 having a smaller dimension in lamination direction x of multilayer body 12. This is because the mechanical strength of multilayer body 12 decreases as multilayer body 12 has a smaller dimension in lamination direction x of multilayer body 12.

Internal Electrode Layer

Internal electrode layer 16 includes a first internal electrode layer 16a exposed to first end surface 12e and a second internal electrode layer 16b exposed to second end surface 12f. First internal electrode layer 16a and second internal electrode layer 16b are alternately laminated with ceramic layers 14 interposed therebetween.

First internal electrode layer 16a is disposed on the surface of ceramic layer 14. First internal electrode layer 16a includes a first counter electrode portion 18a facing second internal electrode layer 16b, and a first extended electrode portion 20a extended from first counter electrode portion 18a to first end surface 12e.

The shape of first counter electrode portion 18a of first internal electrode layer 16a is not particularly limited, but is preferably rectangular or substantially rectangular in plan view. It is to be noted, however, that the corner portion may be rounded in plan view, or the corner portion may have an oblique shape in plan view (may be tapered). Alternatively, the corner portion may have a tapered shape so as to be inclined in either direction in plan view.

The shape of first extended electrode portion 20a of first internal electrode layer 16a is not particularly limited, but is preferably rectangular in plan view. It is to be noted, however, that the corner portion may be rounded in plan view, or the corner portion may have an oblique shape in plan view (may be tapered). Alternatively, the corner portion may have a tapered shape so as to be inclined in either direction in plan view.

First counter electrode portion 18a of first internal electrode layer 16a and first extended electrode portion 20a of first internal electrode layer 16a may be formed to have the same width, or one of them may be narrower than the other.

Second internal electrode layer 16b is disposed on the surface of ceramic layer 14 different from ceramic layer 14 on which first internal electrode layer 16a is disposed. Second internal electrode layer 16b includes a second counter electrode portion 18b facing first internal electrode layer 16a, and a second extended electrode portion 20b extended from second counter electrode portion 18b to second end surface 12f.

The shape of second counter electrode portion 18b of second internal electrode layer 16b is not particularly limited, but is preferably rectangular or substantially rectangular in plan view. It is to be noted, however, that the corner portion may be rounded in plan view, or the corner portion may have an oblique shape in plan view (may be tapered). Alternatively, the corner portion may have a tapered shape so as to be inclined in either direction in plan view.

The shape of second extended electrode portion 20b of second internal electrode layer 16b is not particularly limited, but is preferably rectangular or substantially rectangular in plan view. It is to be noted, however, that the corner portion may be rounded in plan view, or the corner portion may have an oblique shape in plan view (may be tapered). Alternatively, the corner portion may have a tapered shape so as to be inclined in either direction in plan view.

Second counter electrode portion 18b of second internal electrode layer 16b and second extended electrode portion 20b of second internal electrode layer 16b may be formed to have the same width, or one of them may be narrower than the other.

First internal electrode layer 16a and second internal electrode layer 16b can be made of an appropriate conductive material that is metal such as Ni, Cu, Ag, Pd, or Au, or an alloy including at least one of these metals such as an Ag—Pd alloy.

In a case where a piezoelectric ceramic is used for multilayer body 12, the multilayer ceramic electronic component functions as a ceramic piezoelectric element 10a. Specific examples of the piezoelectric ceramic material include PZT (lead zirconate titanate)-based ceramic materials.

In a case where a semiconductor ceramic is used for multilayer body 12, the multilayer ceramic electronic component functions as a thermistor element 10b. Specific examples of the semiconductor ceramic material include spinel-based ceramic materials.

In a case where a magnetic ceramic is used for multilayer body 12, the multilayer ceramic electronic component functions as an inductor element 10c. When the multilayer ceramic electronic component functions as inductor element 10c, internal electrode layer 16 is a coil-shaped conductor. Specific examples of the magnetic ceramic material include ferrite ceramic materials.

That is, the multilayer ceramic electronic component according to the present preferred embodiment can suitably function as not only multilayer ceramic capacitor 10 but also ceramic piezoelectric element 10a, thermistor element 10b, or inductor element 10c by appropriately changing the material and structure of multilayer body 12.

The thickness of each of first internal electrode layer 16a and second internal electrode layer 16b is preferably equal to or greater than about 0.2 μm and equal to or less than about 2.0 μm, for example.

The number of first internal electrode layers 16a and second internal electrode layers 16b is preferably equal to or greater than 2 and equal to or less than 190 in total.

In the present preferred embodiment, first counter electrode portion 18a and second counter electrode portion 18b of internal electrode layer 16 face each other with ceramic layer 14 interposed therebetween, so that a capacitance is generated, and characteristics of the capacitor are exhibited.

Auxiliary Electrode Layer

An auxiliary electrode layer 40 includes a first auxiliary electrode layer 40a and a second auxiliary electrode layer 40b.

First auxiliary electrode layer 40a spaced away from second internal electrode layer 16b and exposed to first end surface 12e is disposed on the same plane as ceramic layer 14 on which second internal electrode layer 16b is disposed. First auxiliary electrode layer 40a faces first extended electrode portion 20a of first internal electrode layer 16a with ceramic layer 14 interposed therebetween. Due to first auxiliary electrode layer 40a being disposed in this way, it is possible to increase the proportion of metal having higher hardness than ceramic layers 14 of multilayer body 12 in multilayer ceramic capacitor 10. As a result, the mechanical strength of multilayer ceramic capacitor 10 can be improved, and generation of cracks and flaws in multilayer ceramic capacitor 10 can be prevented.

The shape of first auxiliary electrode layer 40a is not particularly limited, but is preferably rectangular or substantially rectangular in plan view. It is to be noted, however, that the corner portion may be rounded in plan view, or the corner portion may have an oblique shape in plan view (may be tapered). Alternatively, the corner portion may have a tapered shape so as to be inclined in either direction in plan view.

Second counter electrode portion 18b of second internal electrode layer 16b and first auxiliary electrode layer 40a may be formed to have the same width, or one of them may be narrower than the other.

Second auxiliary electrode layer 40b spaced away from first internal electrode layer 16a and exposed to second end surface 12f is disposed on the same plane as ceramic layer 14 on which first internal electrode layer 16a is disposed. Second auxiliary electrode layer 40b faces second extended electrode portion 20b of second internal electrode layer 16b with ceramic layer 14 interposed therebetween. Due to second auxiliary electrode layer 40b being disposed in this way, it is possible to increase the proportion of metal having higher hardness than ceramic layers 14 of multilayer body 12 in multilayer ceramic capacitor 10. As a result, the mechanical strength of multilayer ceramic capacitor 10 can be improved, and generation of cracks and flaws in multilayer ceramic capacitor 10 can be prevented.

The shape of second auxiliary electrode layer 40b is not particularly limited, but is preferably rectangular or substantially rectangular in plan view. It is to be noted, however, that the corner portion may be rounded in plan view, or the corner portion may have an oblique shape in plan view (may be tapered). Alternatively, the corner portion may have a tapered shape so as to be inclined in either direction in plan view.

First counter electrode portion 18a of first internal electrode layer 16a and second auxiliary electrode layer 40b may be formed to have the same width, or one of them may be narrower than the other.

Similar to internal electrode layer 16, first auxiliary electrode layer 40a and second auxiliary electrode layer 40b can be made of, for example, an appropriate conductive material that is metal such as Ni, Cu, Ag, Pd, or Au, or an alloy including at least one of these metals such as an Ag—Pd alloy.

The thickness of each of first auxiliary electrode layer 40a and second auxiliary electrode layer 40b is preferably equal to or greater than about 0.2 μm and equal to or less than about 2.0 μm, for example.

Via Conductor

A via conductor 42 includes a first via conductor 42a and a second via conductor 42b.

First via conductor 42a is disposed so as to be exposed to first end surface 12e between the side closest to first principal surface 12a of inner layer portion 15a and the side closest to second principal surface 12b of inner layer portion 15a in first internal electrode layer 16a and first auxiliary electrode layer 40a. In the present preferred embodiment, first via conductor 42a extends continuously from the side closest to first principal surface 12a of inner layer portion 15a to the side closest to second principal surface 12b of inner layer portion 15a in multilayer body 12.

With such a configuration, the proportion of metal having higher hardness than ceramic layers 14 of multilayer body 12 can also be increased along lamination direction x in inner layer portion 15a. As a result, the mechanical strength of multilayer ceramic capacitor 10 can be further improved, and generation of cracks and flaws in multilayer ceramic capacitor 10 can be prevented. In addition, first via conductor 42a is disposed in inner layer portion 15a without being exposed to first principal surface 12a and second principal surface 12b of multilayer body 12, whereby intrusion of moisture from the outer surface of multilayer body 12 can be reduced or prevented, and moisture resistance reliability can also be improved. Furthermore, by providing first via conductor 42a, a contact point to be connected to external electrode 24 can be exposed on the surface of first end surface 12e of multilayer body 12. Therefore, barrel polishing for exposing internal electrode layers 16 to first end surface 12e and second end surface 12f of multilayer body 12 is not needed for multilayer body 12 that has not been fired and multilayer body 12 that has been fired, so that a decrease in mechanical strength of multilayer body 12 can be reduced or prevented without damaging multilayer body 12 before firing or after firing. Therefore, even when T dimension, which is the dimension (thickness dimension) of multilayer ceramic capacitor 10 in lamination direction x, is particularly small, cracks and flaws can be reduced or prevented.

Second via conductor 42b is disposed so as to be exposed to second end surface 12f between the side closest to first principal surface 12a of inner layer portion 15a and the side closest to second principal surface 12b of inner layer portion 15a in second internal electrode layer 16b and second auxiliary electrode layer 40b. In the present preferred embodiment, second via conductor 42b extends continuously from the side closest to first principal surface 12a of inner layer portion 15a to the side closest to second principal surface 12b of inner layer portion 15a in multilayer body 12.

With such a configuration, the proportion of metal having higher hardness than ceramic layers 14 of multilayer body 12 can also be increased along lamination direction x in inner layer portion 15a. As a result, the mechanical strength of multilayer ceramic capacitor 10 can be further improved, and generation of cracks and flaws in multilayer ceramic capacitor 10 can be prevented. In addition, second via conductor 42b is disposed in inner layer portion 15a without being exposed to first principal surface 12a and second principal surface 12b of multilayer body 12, whereby intrusion of moisture from the outer surface of multilayer body 12 can also be reduced or prevented, and moisture resistance reliability can also be improved. Furthermore, by providing second via conductor 42b, a contact point to be connected to external electrode 24 can be exposed on the surface of second end surface 12f of multilayer body 12. Therefore, barrel polishing for exposing internal electrode layers 16 to first end surface 12e and second end surface 12f of multilayer body 12 is not needed for multilayer body 12 that has not been fired and multilayer body 12 that has been fired, so that a decrease in mechanical strength of multilayer body 12 can be reduced or prevented without damaging multilayer body 12 before firing or after firing. Therefore, even when T dimension, which is the dimension (thickness dimension) of multilayer ceramic capacitor 10 in lamination direction x, is particularly small, cracks and flaws can be reduced or prevented.

In addition, the position where first via conductor 42a is disposed is not particularly limited as long as first via conductor 42a is exposed on first end surface 12e and is disposed between the side closest to first principal surface 12a of inner layer portion 15a and the side closest to second principal surface 12b of inner layer portion 15a, but it is preferable that first via conductor 42a is disposed at the central portion in width direction y of first internal electrode layer 16a and first auxiliary electrode layer 40a.

The position where second via conductor 42b is disposed is not particularly limited as long as second via conductor 42b is exposed on second end surface 12f and is disposed between the side closest to first principal surface 12a of inner layer portion 15a and the side closest to second principal surface 12b of inner layer portion 15a, but it is preferable that second via conductor 42b is disposed at the central portion in width direction y of second internal electrode layer 16b and second auxiliary electrode layer 40b.

Further, dimension a1 of first via conductor 42a in length direction z is preferably greater than or equal to about 10% and less than or equal to about 50% of dimension A1 of first auxiliary electrode layer 40a in length direction z, for example. With this configuration, it is possible to increase the proportion of metal having higher hardness than ceramic layers 14 of multilayer body 12 in multilayer ceramic capacitor 10. As a result, the mechanical strength of multilayer ceramic capacitor 10 can be improved, and generation of cracks and flaws in multilayer ceramic capacitor 10 can be effectively prevented.

In a case where dimension a1 of first via conductor 42a in length direction z is smaller than about 10% of dimension A1 of first auxiliary electrode layer 40a in length direction z, the proportion of metal having higher hardness than ceramic layers 14 of multilayer body 12 cannot be sufficiently increased in multilayer ceramic capacitor 10, and thus, it may not be possible to sufficiently prevent cracks and flaws in multilayer ceramic capacitor 10 in some cases. In addition, when dimension a1 of first via conductor 42a in length direction z is greater than about 50% of dimension A1 of first auxiliary electrode layer 40a in length direction z, the distance between first via conductor 42a and the end of second internal electrode layer 16b facing first via conductor 42a is shortened, so that it is considered that the risk of moisture intrusion is increased and the moisture resistance reliability is deteriorated.

Dimension a2 of second via conductor 42b in length direction z is preferably greater than or equal to about 10% and less than or equal to about 50% of dimension A2 of second auxiliary electrode layer 40b in length direction z, for example. With this configuration, it is possible to increase the proportion of metal having higher hardness than ceramic layers 14 of multilayer body 12 in multilayer ceramic capacitor 10. As a result, the mechanical strength of multilayer ceramic capacitor 10 can be improved, and generation of cracks and flaws in multilayer ceramic capacitor 10 can be effectively prevented.

In a case where dimension a2 of second via conductor 42b in length direction z is smaller than about 10% of dimension A2 of second auxiliary electrode layer 40b in length direction z, the proportion of metal having higher hardness than ceramic layers 14 of multilayer body 12 cannot be sufficiently increased in multilayer ceramic capacitor 10, and thus, it may not be possible to sufficiently prevent cracks and flaws in multilayer ceramic capacitor 10 in some cases. In addition, when dimension a2 of second via conductor 42b in length direction z is greater than about 50% of dimension A2 of second auxiliary electrode layer 40b in length direction z, the distance between second via conductor 42b and the end of first internal electrode layer 16a facing second via conductor 42b is shortened, so that it is considered that the risk of moisture intrusion is increased and the moisture resistance reliability is deteriorated.

Further, dimension b1 of first via conductor 42*a* in width direction y is preferably greater than or equal to about 10% and less than or equal to about 50% of dimension B1 of first auxiliary electrode layer 40*a* in width direction y, for example. With this configuration, it is possible to increase the proportion of metal having higher hardness than ceramic layers 14 of multilayer body 12 in multilayer ceramic capacitor 10. As a result, the mechanical strength of multilayer ceramic capacitor 10 can be improved, and generation of cracks and flaws in multilayer ceramic capacitor 10 can be effectively prevented.

In a case where dimension b1 of first via conductor 42*a* in width direction y is smaller than about 10% of dimension B1 of first auxiliary electrode layer 40*a* in width direction y, the proportion of metal having higher hardness than ceramic layers 14 of multilayer body 12 cannot be sufficiently increased in multilayer ceramic capacitor 10, and thus, it may not be possible to sufficiently prevent cracks and flaws in multilayer ceramic capacitor 10 in some cases. In addition, when dimension b1 of first via conductor 42*a* in width direction y is greater than about 50% of dimension B1 of first auxiliary electrode layer 40*a* in width direction y, the distance between first via conductor 42*a* and each of a first lateral surface 12*c* side end and a second lateral surface 12*d* side end of external electrode 24 disposed on first end surface 12*e* is shortened, so that it is considered that the risk of moisture intrusion is increased and the moisture resistance reliability is deteriorated.

Dimension b2 (not illustrated) of second via conductor 42*b* in width direction y is preferably greater than or equal to about 10% and less than or equal to 50% of dimension B2 (not illustrated) of second auxiliary electrode layer 40*b* in width direction y. With this configuration, it is possible to increase the proportion of metal having higher hardness than ceramic layers 14 of multilayer body 12 in multilayer ceramic capacitor 10. As a result, the mechanical strength of multilayer ceramic capacitor 10 can be improved, and generation of cracks and flaws in multilayer ceramic capacitor 10 can be effectively prevented.

In a case where dimension b2 (not illustrated) of second via conductor 42*b* in width direction y is smaller than about 10% of dimension B2 (not illustrated) of second auxiliary electrode layer 40*b* in width direction y, the proportion of metal having higher hardness than ceramic layers 14 of multilayer body 12 cannot be sufficiently increased in multilayer ceramic capacitor 10, and thus, it may not be possible to sufficiently prevent cracks and flaws in multilayer ceramic capacitor 10 in some cases. In addition, when dimension b2 (not illustrated) of second via conductor 42*b* in width direction y is greater than about 50% of dimension B2 (not illustrated) of second auxiliary electrode layer 40*b* in width direction y, the distance between second via conductor 42*b* and each of a first lateral surface 12*c* side end and a second lateral surface 12*d* side end of external electrode 24 disposed on second end surface 12*f* is shortened, so that it is considered that the risk of moisture intrusion is increased and the moisture resistance reliability is deteriorated.

The shapes of first via conductor 42*a* and second via conductor 42*b* are not particularly limited, but are preferably shapes having a curved portion and a straight portion in plan view, for example, a semicircular shape in plan view. In this case, it is preferable that the straight portion is exposed to first end surface 12*e* or second end surface 12*f*, and the curved portion is located on the inner side of multilayer body 12. In other words, the portion where first via conductor 42*a* and second via conductor 42*b* are disposed is preferably cut in a shape having a curved portion and a straight portion in plan view, for example, a semicircular shape in plan view.

This configuration makes it easy to fill a first via conductor paste and a second via conductor paste during formation of first via conductor 42*a* and second via conductor 42*b*, whereby first via conductor 42*a* and second via conductor 42*b* can be formed without generating any gap between both first internal electrode layer 16*a* and first auxiliary electrode layer 40*a* and first via conductor 42*a* and between both second internal electrode layer 16*b* and second auxiliary electrode layer 40*b* and second via conductor 42*b*. Thus, multilayer ceramic capacitor 10 with high reliability can be obtained.

Similar to internal electrode layer 16 and first auxiliary electrode layer 40, first via conductor 42*a* and second via conductor 42*b* can be made of, for example, an appropriate conductive material that is metal such as Ni, Cu, Ag, Pd, or Au, or an alloy including at least one of these metals such as an Ag—Pd alloy.

External Electrode

External electrodes 24 include a plurality of external electrodes 24 connected to first internal electrode layer 16*a* and second internal electrode layer 16*b*. External electrodes 24 have at least a first external electrode 24*a* and a second external electrode 24*b*.

First external electrode 24*a* is disposed on multilayer body 12. Preferably, first external electrode 24*a* is disposed on first end surface 12*e* and extends to a part of first principal surface 12*a* and a part of second principal surface 12*b*. In this configuration, first external electrode 24*a* may not be disposed on a part of first lateral surface 12*c* and a part of second lateral surface 12*d*, or may be disposed so as to slightly wrap around a part of first lateral surface 12*c* and a part of second lateral surface 12*d*. In the present preferred embodiment, first external electrode 24*a* is not disposed on a part of first lateral surface 12*c* and a part of second lateral surface 12*d*.

Second external electrode 24*b* is disposed on multilayer body 12. Preferably, second external electrode 24*b* is disposed on second end surface 12*f* and extends to a part of first principal surface 12*a* and a part of second principal surface 12*b*. In this configuration, second external electrode 24*b* may not be disposed on a part of first lateral surface 12*c* and a part of second lateral surface 12*d*, or may be disposed so as to slightly wrap around a part of first lateral surface 12*c* and a part of second lateral surface 12*d*. In the present preferred embodiment, second external electrode 24*b* is not disposed on a part of first lateral surface 12*c* and a part of second lateral surface 12*d*.

Each of first external electrode 24*a* and second external electrode 24*b* preferably has a base electrode layer 26 and a plating layer 28.

Base electrode layer 26 includes at least one selected from a baked layer, a thin film layer, and the like.

First, a case where base electrode layer 26 includes a baked layer will be described.

The baked layer preferably includes a metal component and/or a glass component or a ceramic component. The glass component includes at least one selected from B, Si, Ba, Mg, Al, Li, and the like. As the ceramic component, the same type of ceramic material as that of ceramic layer 14 may be used, or a different type of ceramic material may be used. The ceramic component preferably includes, for example, at least one selected from $BaTiO_3$, $CaTiO_3$, (Ba, Ca)$TiO_3$, $SrTiO_3$, $CaZrO_3$, and the like. The metal of the baked layer includes, for example, at least one selected from Cu, Ni, Ag, Pd, Ag—Pd alloy, Au, and the like. Further, the baked layer may have a plurality of layers.

The baked layer is obtained by applying a conductive paste including a glass component and a metal component to a multilayer body 12 and baking the resultant. The baked layer may be fired simultaneously with internal electrode layers 16 and ceramic layers 14, or may be baked after internal electrode layers 16 are fired. Note that, in a case where the baked layer is fired simultaneously with internal electrode layers 16 and ceramic layers 14, it is preferable to add a ceramic component instead of the glass component or to add both of them to form the baked layer.

The thicknesses (end surface central thicknesses) of a first baked layer and a second baked layer, which are located on first end surface 12e and second end surface 12f, in length direction z connecting first end surface 12e and second end surface 12f at the central portion of the first baked layer and the second baked layer in lamination direction x connecting first principal surface 12a and second principal surface 12b are preferably greater than or equal to about 5 μm and less than or equal to about 50 μm, for example.

When the base electrode layer (baked layer) is also provided on a part of first principal surface 12a and a part of second principal surface 12b, the thicknesses of the first baked layer and the second baked layer, which are located on first principal surface 12a and second principal surface 12b, in lamination direction x connecting first principal surface 12a and second principal surface 12b at the central portion of the first baked layer and the second baked layer in length direction z connecting first end surface 12e and second end surface 12f are preferably, for example, greater than or equal to about 2 μm and less than or equal to about 15 μm.

Next, a case where base electrode layer 26 includes a thin film layer will be described.

When base electrode layer 26 includes a thin film layer, the thin film layer is preferably a thin film electrode of a metal film formed by a thin film forming method such as a sputtering method or a vapor deposition method. In the present preferred embodiment, the metal film which is a thin film layer is formed by a sputtering method.

The thin film electrode disposed on multilayer body 12 includes at least one selected from Mg, Al, Ti, W, Cr, Cu, Ni, Ag, Co, Mo, and V. The thin film electrode composed of the thin film layer may include a plurality of layers. In the present preferred embodiment, the first layer is a NiCr layer, and the second layer is a NiCu layer.

The thickness of base electrode layer 26 including the thin film layer in lamination direction x connecting first principal surface 12a and second principal surface 12b is preferably greater than or equal to about 50 nm and less than or equal to about 8 μm, and more preferably greater than or equal to about 100 nm and less than or equal to about 4 μm, for example.

When base electrode layer 26 includes a thin film layer, it is preferable to directly form thin film electrodes (sputtering electrodes) 26a1, 26a2, 26b1, and 26b2 on a part of first principal surface 12a and a part of second principal surface 12b of multilayer body 12 by a sputtering method. When a thin film electrode (sputtering electrode) is directly disposed on a part of first principal surface 12a and a part of second principal surface 12b of multilayer body 12, it is preferable to form base electrode layer 26 including a baked layer on first end surface 12e and second end surface 12f, or directly form a plating layer 28 described later without forming base electrode layer 26. In the present preferred embodiment, plating layer 28 described later is directly formed on first end surface 12e and second end surface 12f without forming base electrode layer 26. Specifically, a Cu plating layer 30, an Ni plating layer 32, and an Sn plating layer 34 are formed. Cu plating layer 30 is disposed on thin film electrodes 26a1, 26a2, 26b1, and 26b2, Ni plating layer 32 is disposed on Cu plating layer 30, and Sn plating layer 34 is disposed on Ni plating layer 32. As described above, due to the configuration in which a thin film electrode including a thin film layer is formed as base electrode layer 26, Cu plating layer 30 is disposed on the thin film electrode including the thin film layer formed as base electrode layer 26, Ni plating layer 32 is disposed on Cu plating layer 30, and Sn plating layer 34 is disposed on Ni plating layer 32, the thickness of external electrode 24 can be reduced, so that the dimension of multilayer body 12 can be made as thick as possible within the range of the standard dimension. Therefore, it is possible to not only ensure the mechanical strength of multilayer body 12, but also improve a degree of freedom in capacity design.

When base electrode layer 26 including a baked layer is formed on first end surface 12e and second end surface 12f, the baked layer serving as base electrode layer 26 may be disposed not only on first end surface 12e and second end surface 12f but also on a part of first principal surface 12a and a part of second principal surface 12b. In addition, the thin film electrode (sputtering electrode) may be disposed so as to overlap the baked layer serving as base electrode layer 26.

When base electrode layer 26 including a baked layer is formed on first end surface 12e and second end surface 12f, the thickness thereof in length direction z connecting first end surface 12e and second end surface 12f is preferably greater than or equal to about 1 μm and less than or equal to about 5 μm, for example.

Plating Layer

Plating layer 28 includes a first plating layer 28a and a second plating layer 28b.

Plating layer 28 is preferably disposed so as to cover base electrode layer 26. On the other hand, plating layer 28 may be formed directly on multilayer body 12 without base electrode layer 26 therebetween as described above. When plating layer 28 is directly formed on multilayer body 12 without forming base electrode layer 26, a low profile can be achieved by a reduction in thickness of base electrode layer 26 or the thickness of base electrode layer 26 can be converted into the thickness of multilayer body 12, so that the degree of freedom in designing multilayer ceramic capacitor 10 can be improved.

Plating layer 28 includes, for example, at least one selected from Ni, Sn, Cu, Ag, Pd, an Ag—Pd alloy, Au, and the like. Plating layer 28 may include a plurality of layers.

When multilayer ceramic capacitor 10 is mounted on a substrate surface, plating layer 28 preferably has a two-layer structure in the order of Ni plating and Sn plating. Ni plating layer 32 can prevent base electrode layer 26 from being eroded by solder when multilayer ceramic capacitor 10 is mounted. In addition, Sn plating layer 34 improves the wettability of the solder when multilayer ceramic capacitor 10 is mounted, and can make it easy to mount multilayer ceramic capacitor 10. Cu plating layer 30 may be formed between base electrode layer 26 and Ni plating layer 32 or between multilayer body 12 and Ni plating layer 32 when plating layer 28 is formed directly on multilayer body 12 without forming base electrode layer 26. When Cu plating layer 30 is formed, an effect of reducing or preventing intrusion of a plating solution and moisture is obtained. When multilayer ceramic capacitor 10 is embedded in the substrate, plating layer 28 is preferably provided such that the outermost layer is the Cu plating layer.

In the present preferred embodiment, base electrode layer 26 includes a thin film layer, Cu plating layer 30 is formed on the thin film layer, Ni plating layer 32 is formed on Cu plating layer 30, and Sn plating layer 34 is formed on Ni plating layer 32. Thus, the thickness of external electrode 24 can be reduced, whereby the dimension of multilayer body 12 can be made as thick as possible within the range of the standard dimension. Therefore, it is possible to not only ensure the mechanical strength of multilayer body 12, but also improve a degree of freedom in capacity design.

In addition, the thickness of each layer of plating layer 28 is preferably greater than or equal to about 2 μm and less than or equal to about 10 μm, for example. More specifically, the average thickness of Cu plating layer 30 is preferably greater than or equal to about 2 μm and less than or equal to about 8 μm, the average thickness of Ni plating layer 32 is preferably greater than or equal to about 1 μm and less than or equal to about 4 μm, and the average thickness of Sn plating layer 34 is preferably greater than or equal to about 2 μm and less than or equal to about 10 μm, for example.

According to multilayer ceramic capacitor 10 of the first preferred embodiment illustrated in FIG. 1, first auxiliary electrode layer 40a spaced away from second internal electrode layer 16b and exposed to first end surface 12e is disposed on the same plane as ceramic layer 14 on which second internal electrode layer 16b is disposed. In addition, second auxiliary electrode layer 40b spaced away from first internal electrode layer 16a and exposed to second end surface 12f is disposed on the same plane as ceramic layer 14 on which first internal electrode layer 16a is disposed. With this configuration, it is possible to increase the proportion of metal having higher hardness than ceramic layers 14 of multilayer body 12 in multilayer ceramic capacitor 10. As a result, the mechanical strength of multilayer ceramic capacitor 10 can be improved, and generation of cracks and flaws in multilayer ceramic capacitor 10 can be prevented.

Further, according to multilayer ceramic capacitor 10 of the first preferred embodiment illustrated in FIG. 1, first via conductor 42a continuously extending from the side closest to first principal surface 12a of inner layer portion 15a to the side closest to second principal surface 12b of inner layer portion 15a is disposed in first internal electrode layer 16a and first auxiliary electrode layer 40a so as to be exposed to first end surface 12e. In addition, second via conductor 42b continuously extending from the side closest to first principal surface 12a of inner layer portion 15a to the side closest to second principal surface 12b of inner layer portion 15a is disposed in second internal electrode layer 16b and second auxiliary electrode layer 40b so as to be exposed to second end surface 12f. With this configuration, the proportion of metal having higher hardness than ceramic layers 14 of multilayer body 12 can also be increased along lamination direction x in inner layer portion 15a. As a result, the mechanical strength of multilayer ceramic capacitor 10 can be further improved, and generation of cracks and flaws in multilayer ceramic capacitor 10 can be prevented.

In addition, in multilayer ceramic capacitor 10 according to the first preferred embodiment illustrated in FIG. 1, first via conductor 42a and second via conductor 42b are disposed in inner layer portion 15a without being exposed to first principal surface 12a and second principal surface 12b of multilayer body 12, whereby intrusion of moisture from the outer surface of multilayer body 12 can also be reduced or prevented, and moisture resistance reliability can also be improved.

Further, according to multilayer ceramic capacitor 10 of the first preferred embodiment illustrated in FIG. 1, the formation of first via conductor 42a and second via conductor 42b enables contact points to be connected to external electrodes 24 to be necessarily exposed on the surfaces of first end surface 12e and second end surface 12f of multilayer body 12. Therefore, barrel polishing for exposing internal electrode layers 16 to first end surface 12e and second end surface 12f of multilayer body 12 is not needed for multilayer body 12 that has not been fired and multilayer body 12 that has been fired, so that a decrease in mechanical strength of multilayer body 12 can be reduced or prevented without damaging multilayer body 12 before firing or after firing. Thus, even when T dimension, which is the dimension (thickness dimension) of multilayer ceramic capacitor 10 in lamination direction x, is particularly small, cracks and flaws can be reduced or prevented. As a result, multilayer ceramic capacitor 10 can have improved mechanical strength, even though it has a low profile.

2. Method for Manufacturing Multilayer Ceramic Capacitor

Figure 7:
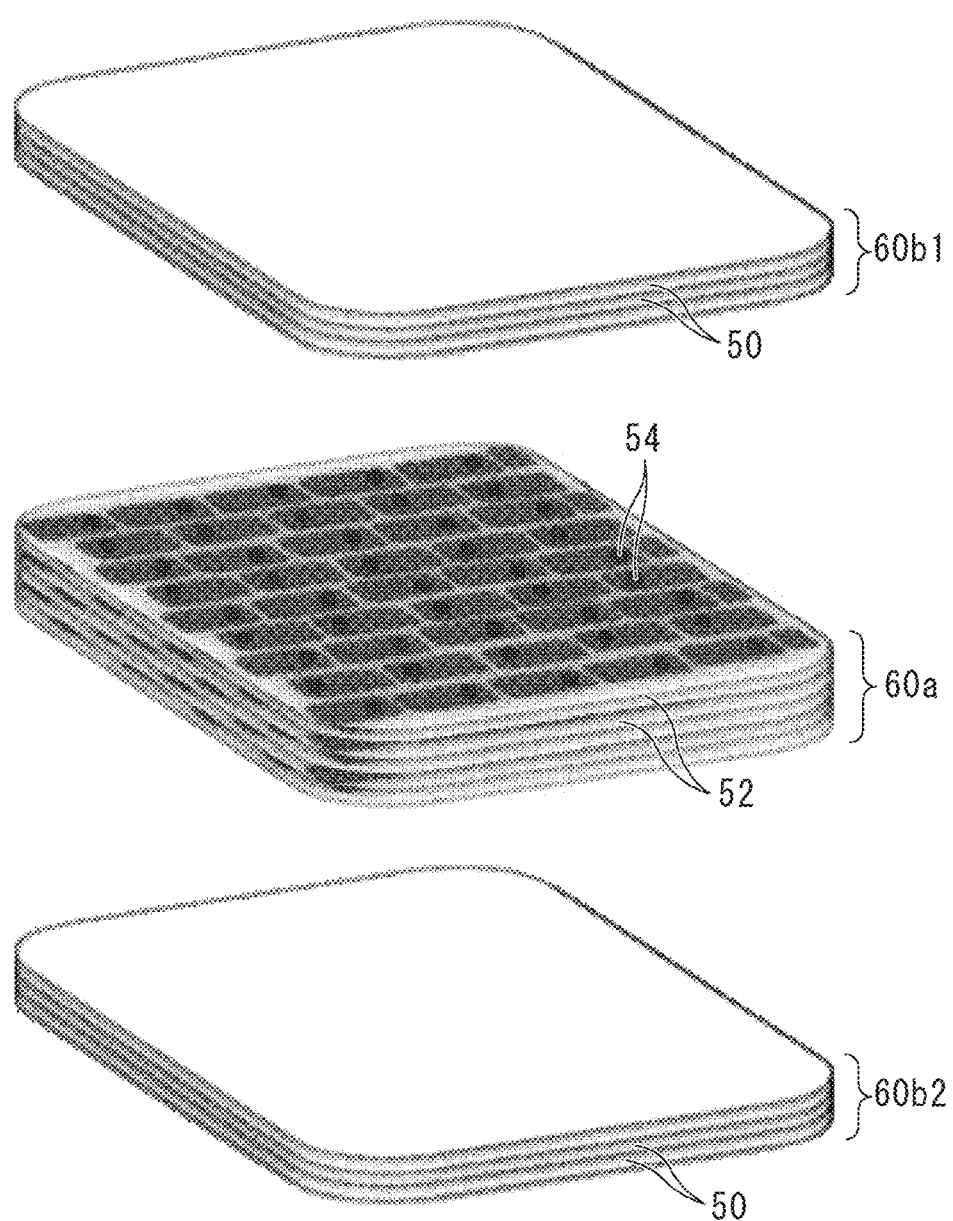
FIG. 7 is a diagram illustrating a portion of a manufacturing process of the multilayer ceramic capacitor as an example of the multilayer ceramic electronic component according to the first preferred embodiment of the present invention.

A method for manufacturing multilayer ceramic capacitor 10 as an example of the multilayer ceramic electronic component according to the first preferred embodiment of the present invention will be described below. FIG. 7 is a diagram illustrating a portion of a manufacturing process of the multilayer ceramic capacitor as an example of the multilayer ceramic electronic component according to the first preferred embodiment of the present invention.

First, a dielectric sheet, a conductive paste for internal electrodes, a conductive paste for auxiliary electrodes, and a conductive paste for via conductors are prepared. The dielectric sheet, the conductive paste for internal electrodes, the conductive paste for auxiliary electrodes, and the conductive paste for via conductors contain binders and solvents. Known binders and solvents can be used.

Next, the conductive paste for internal electrodes and the conductive paste for auxiliary electrodes are printed on the dielectric sheet in a predetermined pattern by, for example, screen printing or gravure printing to form an internal electrode pattern and an auxiliary electrode pattern. Here, the conductive paste for internal electrodes and the conductive paste for auxiliary electrodes are obtained by adding an organic binder and an organic solvent to metal powders. Note that a dielectric sheet for outer layers on which the internal electrode pattern and the auxiliary electrode pattern are not printed is also prepared.

Next, a multilayer sheet is prepared using the dielectric sheets on which the internal electrode pattern and the auxiliary electrode pattern are formed. That is, a predetermined number of dielectric sheets 50 for outer layers on which no internal electrode pattern is formed are laminated to form a dielectric sheet (block) 60b1 for first principal surface-side outer layer portion to be first principal surface-side outer layer portion 15b1 and a dielectric sheet (block) 60b2 for second principal surface-side outer layer portion to be second principal surface-side outer layer portion 15b2, and dielectric sheets 52 on which a first internal electrode pattern corresponding to first internal electrode layers 16a and a second internal electrode pattern corresponding to second internal electrode layers 16b are printed are sequentially laminated to prepare a dielectric sheet (block) 60a to be inner layer portion 15a, as illustrated in FIG. 7. Here, the two dielectric sheets (blocks) 60b1 and 60b2 for outer layers to be first principal surface-side outer layer portion 15b1 and second principal surface-side outer layer portion 15b2, and the dielectric sheet (block) 60a for inner layers are prepared. Dielectric sheet (block) 60a is to be sandwiched between the two dielectric sheets (blocks) for outer layers and is printed with the conductive paste for internal electrodes and the conductive paste for auxiliary electrodes.

Subsequently, prepared dielectric sheet (block) 60a for inner layers is irradiated with a laser at positions where first via conductor 42a and second via conductor 42b are to be provided. Thus, recesses 54 are formed.

Next, a multilayer sheet is prepared using the prepared dielectric sheets. That is, prepared dielectric sheet (block) 60a for inner layers formed with recesses 54 at the positions where first via conductor 42a and second via conductor 42b are to be provided is laminated on dielectric sheet (block) 60b1 for first principal surface-side outer layer portion to be first principal surface-side outer layer portion 15b1 or dielectric sheet (block) 60b2 for second principal surface-side outer layer portion to be second principal surface-side outer layer portion 15b2. Here, recesses 54 formed as described above in dielectric sheet (block) 60a for inner layers at the positions where first via conductor 42a and second via conductor 42b are to be provided are filled with the conductive paste for via conductors.

Further, dielectric sheet (block) 60b1 for first principal surface-side outer layer portion to be first principal surface-side outer layer portion 15b1 or dielectric sheet (block) 60b2 for second principal surface-side outer layer portion to be second principal surface-side outer layer portion 15b2 is laminated. Thus, the multilayer sheet is prepared.

Next, the multilayer sheet is pressed in the lamination direction by isostatic pressing or the like to prepare a multilayer block.

Subsequently, the multilayer block is cut into a predetermined size to obtain a multilayer chip.

Next, the multilayer chip is fired to produce multilayer body 12. The firing temperature is preferably greater than or equal to about 900° C. or less than or equal to about 1400° C., for example, depending on the material of the ceramic or the internal electrode.

Next, base electrode layer 26 is formed on a part of first principal surface 12a and a part of second principal surface 12b of multilayer body 12.

When a thin film layer is formed as base electrode layer 26, the thin film layer can be formed by, for example, a sputtering method or the like. In other words, base electrode layer 26 may include a thin film electrode (sputtering electrode).

When base electrode layer 26 is formed by disposing a thin film electrode (sputtering electrode) on a part of first principal surface 12a and a part of second principal surface 12b of multilayer body 12, it is preferable to form base electrode layer 26 including a baked layer on first end surface 12e and second end surface 12f, or directly form plating layer 8 described later without forming base electrode layer 26. In addition, when base electrode layer 26 including a baked layer is formed on first end surface 12e and second end surface 12f, the baked layer serving as base electrode layer 26 may be disposed not only on first end surface 12e and second end surface 12f but also on a part of first principal surface 12a and a part of second principal surface 12b. In addition, the thin film electrode (sputtering electrode) may be disposed so as to overlap the baked layer serving as base electrode layer 26. In the present preferred embodiment, plating layer 28 described later is directly formed on first end surface 12e and second end surface 12f without forming base electrode layer 26.

In addition, the thin film electrode which is base electrode layer 26 formed of a thin film layer disposed on multilayer body 12 preferably includes, for example, at least one metal selected from the group consisting of Mg, Al, Ti, W, Cr, Cu, Ni, Ag, Co, Mo, and V. Thus, the fixing strength of base electrode layer 26 to multilayer body 12 an be enhanced. The thin film layer may be a single layer or may include a plurality of layers. In the present preferred embodiment, the thin film layer has a two-layer structure of a NiCr layer and a NiCu layer.

When a baked layer is formed as base electrode layer 26, base electrode layer 26 is formed by applying a conductive paste to be base electrode layer 26 to first end surface 12e and second end surface 12f of multilayer body 12. When a baked layer is formed as base electrode layer 26, base electrode layer 26 is formed by applying a conductive paste including a glass component and metal by a method such as dipping, and then performing a baking treatment. The temperature of the baking treatment is preferably greater than or equal to about 700° C. and less than or equal to about 900° C., for example. During this treatment, portions where external electrode 24 is not intended to be formed, for example, first lateral surface 12c and second lateral surface 12d, are masked, by which a region where external electrode 24 is not formed can be produced.

When base electrode layer 26 includes a baked layer, the baked layer preferably further includes a ceramic component. The ceramic component is preferably a ceramic material of the same type as that of multilayer body 12, for example. When a ceramic component is added to the baked layer, it is preferable that multilayer body 12 having the baked layer formed thereon is formed by applying a conductive paste to the multilayer chip which has not been fired, and simultaneously baking the multilayer chip and the conductive paste applied to the multilayer chip.

Thereafter, plating layer 28 is applied on base electrode layer 26 and the surface of multilayer body 12 as necessary. In the present preferred embodiment, plating layer 28 has a three-layer structure of Cu plating layer 30, Ni plating layer 32, and Sn plating layer 34.

As described above, multilayer ceramic capacitor 10 illustrated in FIG. 1 can be manufactured.

B. Second Preferred Embodiment

Figure 8:
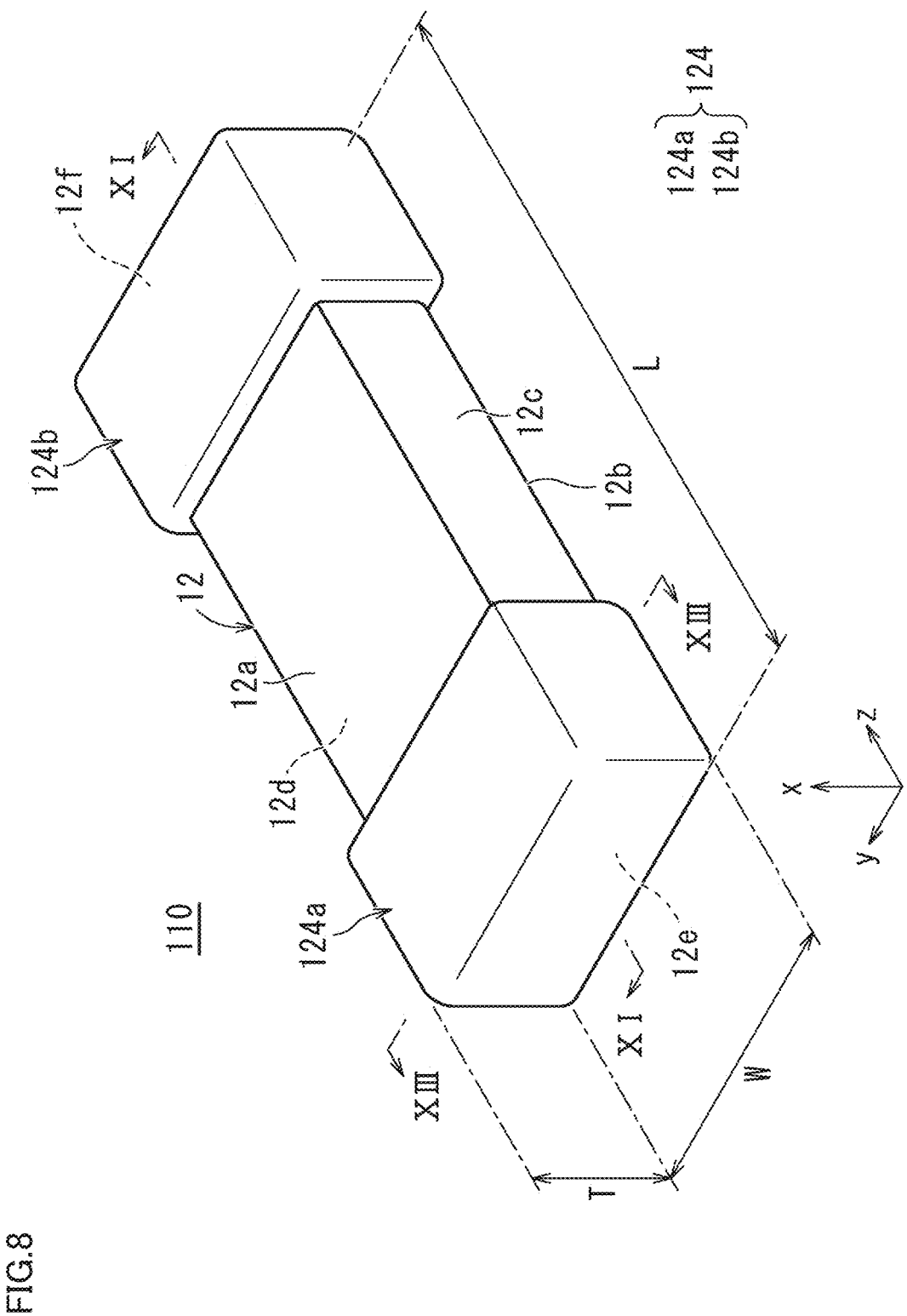
FIG. 8 is an external perspective view illustrating a multilayer ceramic capacitor as an example of a multilayer ceramic electronic component according to a second preferred embodiment of the present invention.
Figure 9:
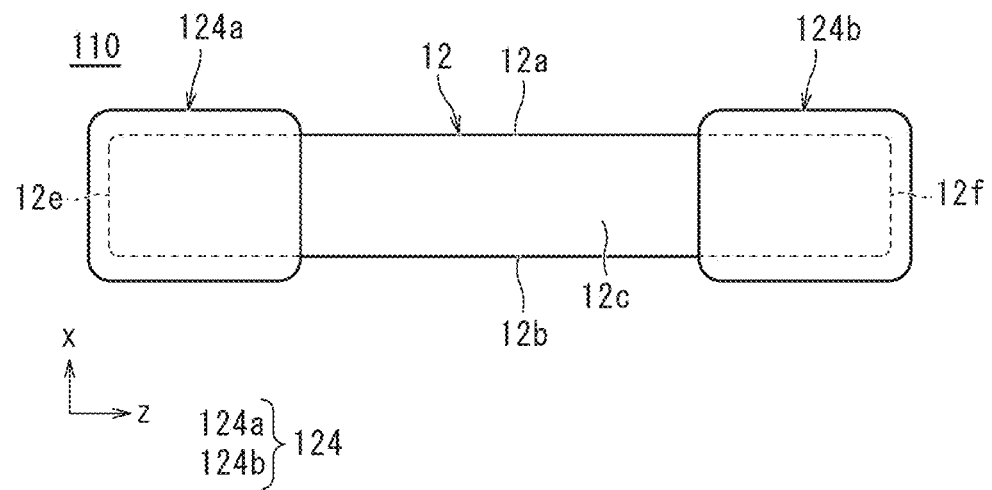
FIG. 9 is a front view illustrating the multilayer ceramic capacitor as an example of the multilayer ceramic electronic component according to the second preferred embodiment of the present invention.
Figure 10:
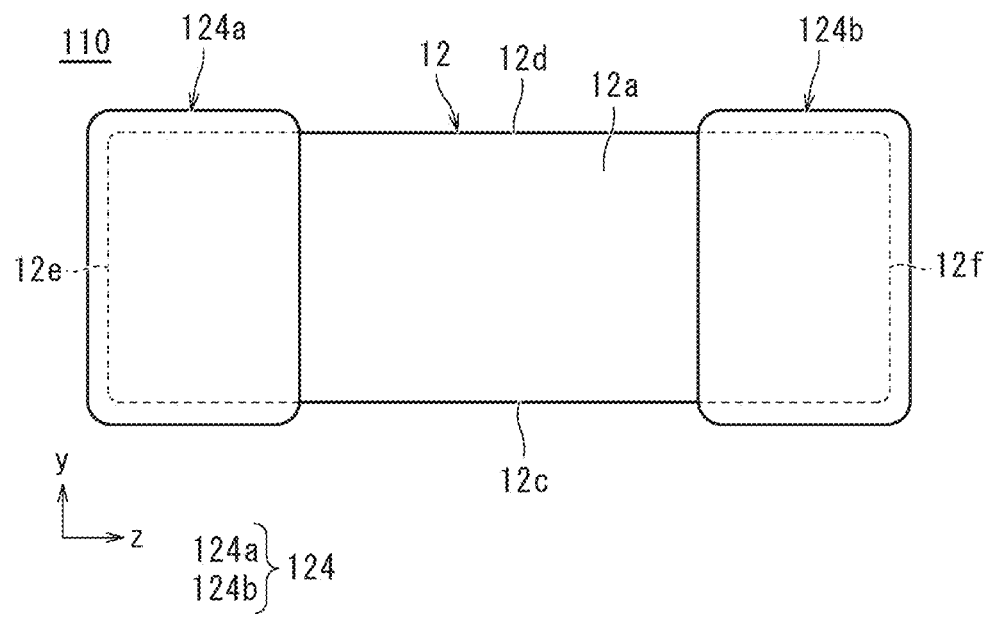
FIG. 10 is a top view illustrating the multilayer ceramic capacitor as an example of the multilayer ceramic electronic component according to the second preferred embodiment of the present invention.
Figure 11:
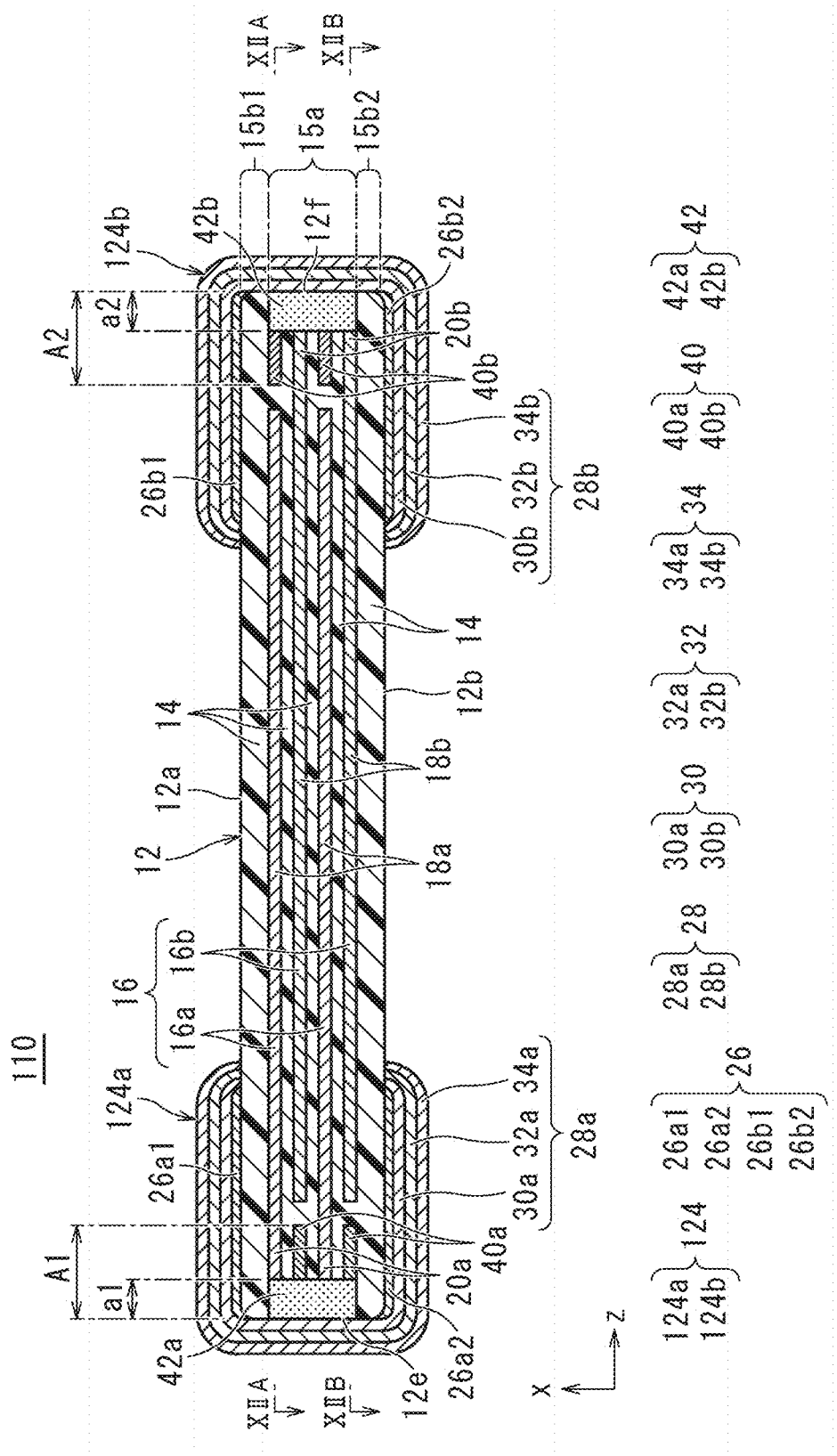
FIG. 11 is a cross-sectional view taken along line XI-XI in FIG. 8.
Figure 12A:
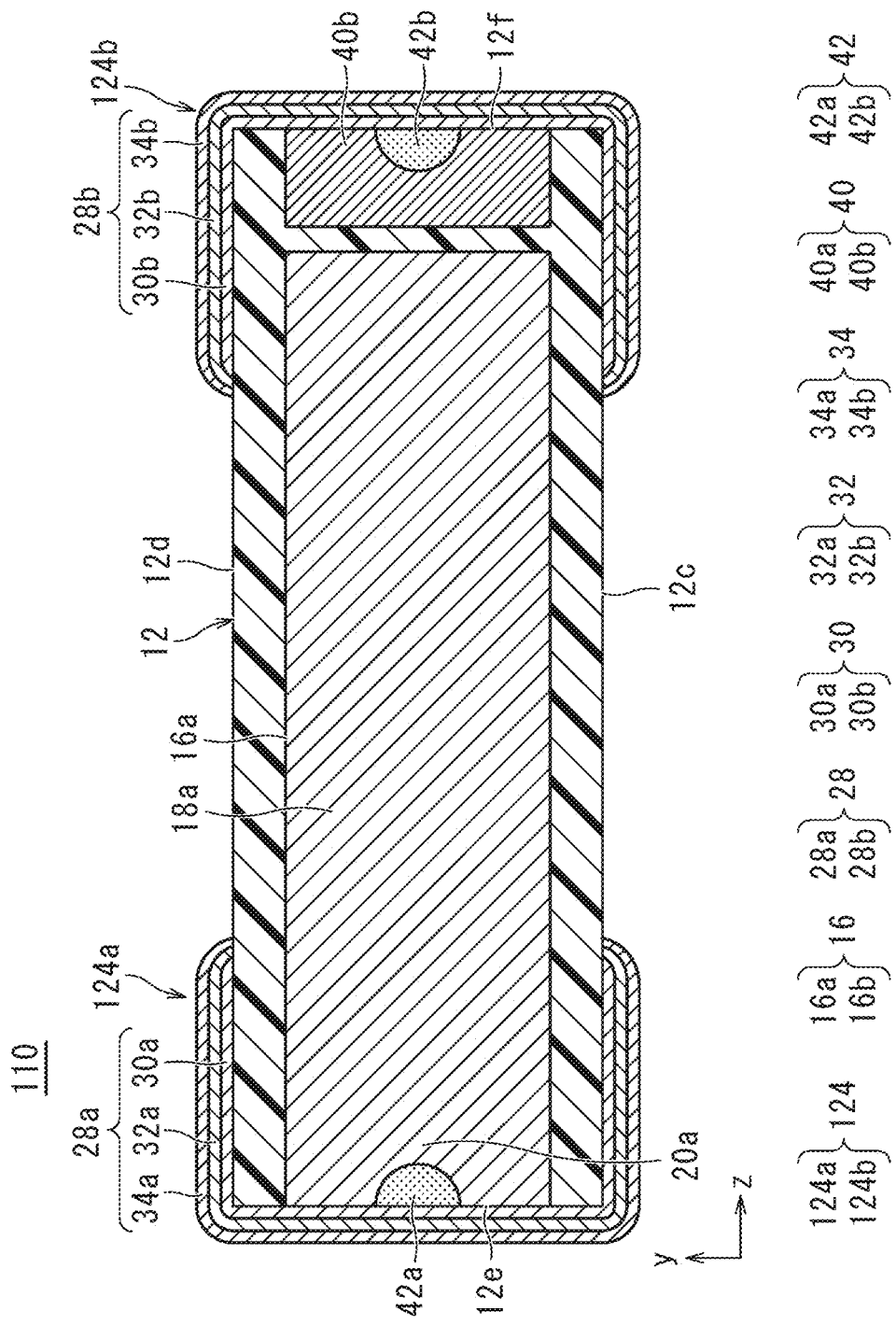
FIG. 12A is a cross-sectional view taken along line XIIA-XIIA in FIG. 11.
Figure 13:
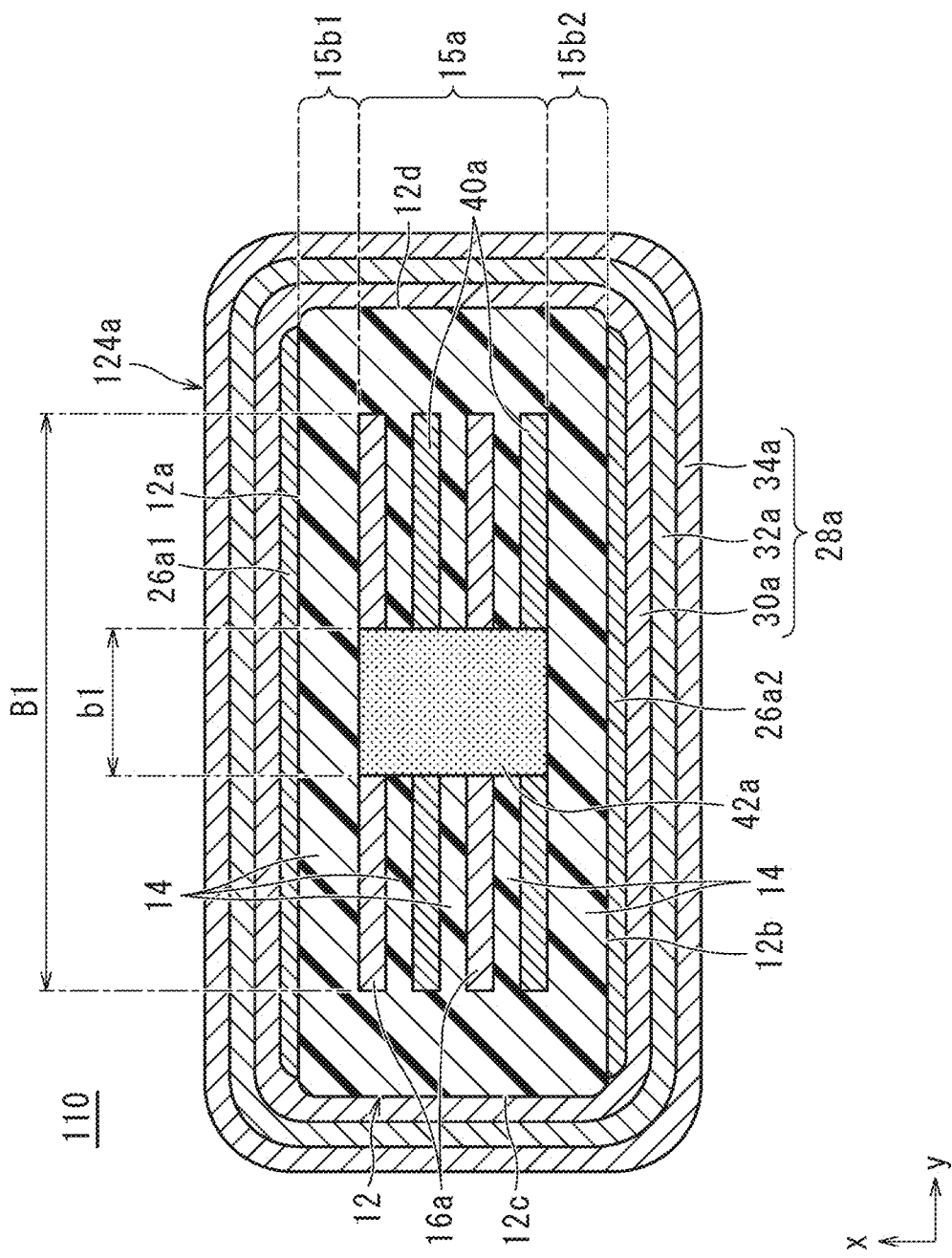
FIG. 13 is a cross-sectional view taken along line XIII-XIII in FIG. 8.

A multilayer ceramic capacitor 110 as an example of a multilayer ceramic electronic component according to the second preferred embodiment of the present invention will be described. FIG. 8 is an external perspective view illustrating the multilayer ceramic capacitor as an example of the multilayer ceramic electronic component according to the second preferred embodiment of the present invention. FIG. 9 is a front view illustrating the multilayer ceramic capacitor as an example of the multilayer ceramic electronic component according to the second preferred embodiment of the present invention. FIG. 10 is a top view illustrating the multilayer ceramic capacitor as an example of the multilayer ceramic electronic component according to the second preferred embodiment of the present invention. FIG. 11 is a cross-sectional view taken along line XI-XI in FIG. 8. FIG. 12A is a cross-sectional view taken along line XIIA-XIIA in FIG. 11. FIG. 12B is a cross-sectional view taken along line XIIB-XIIB in FIG. 11. FIG. 13 is a cross-sectional view taken along line XIII-XIII in FIG. 8.

In multilayer ceramic capacitor 110 according to the second preferred embodiment, an external electrode 124 is disposed not only on first end surface 12e, second end surface 12f, first principal surface 12a, and second principal surface 12b, but also on first lateral surface 12c and second lateral surface 12d as illustrated in FIG. 8. Therefore, components corresponding to the components of the first preferred embodiment are denoted by the same reference numerals, and the detailed description thereof will be omitted.

External electrode 124 includes a plurality of external electrodes 124 connected to first internal electrode layer 16a and second internal electrode layer 16b. External electrode 124 has at least a first external electrode 124a and a second external electrode 124b.

First external electrode 124a is disposed on multilayer body 12. More specifically, first external electrode 124a is disposed on the surface of first end surface 12e, a part of first principal surface 12a, a part of second principal surface 12b, a part of first lateral surface 12c, and a part of second lateral surface 12d of multilayer body 12.

Second external electrode 124b is disposed on multilayer body 12. More specifically, second external electrode 124b is disposed on the surface of second end surface 12f, a part of first principal surface 12a, a part of second principal surface 12b, a part of first lateral surface 12c, and a part of second lateral surface 12d of multilayer body 12.

Each of first external electrode 124a and second external electrode 124b preferably includes base electrode layer 26 and plating layer 28. The structures of base electrode layer 26 and plating layer 28 of multilayer ceramic capacitor 110 according to the present preferred embodiment are the same as the structures of base electrode layer 26 and plating layer 28 of multilayer ceramic capacitor 10 according to the first preferred embodiment.

With this configuration, base electrode layer 26 and plating layer 28 are also formed on first lateral surface 12c and second lateral surface 12d of multilayer body 12, whereby an occurrence of cracks and flaws due to impact from first lateral surface 12c and second lateral surface 12d can be reduced or prevented, and further, mountability with a mounting substrate can be improved.

Multilayer ceramic capacitor 110 according to the second preferred embodiment illustrated in FIG. 8 has the same effect as multilayer ceramic capacitor 10 according to the first preferred embodiment illustrated in FIG. 1.

C. Third Preferred Embodiment

Figure 14:
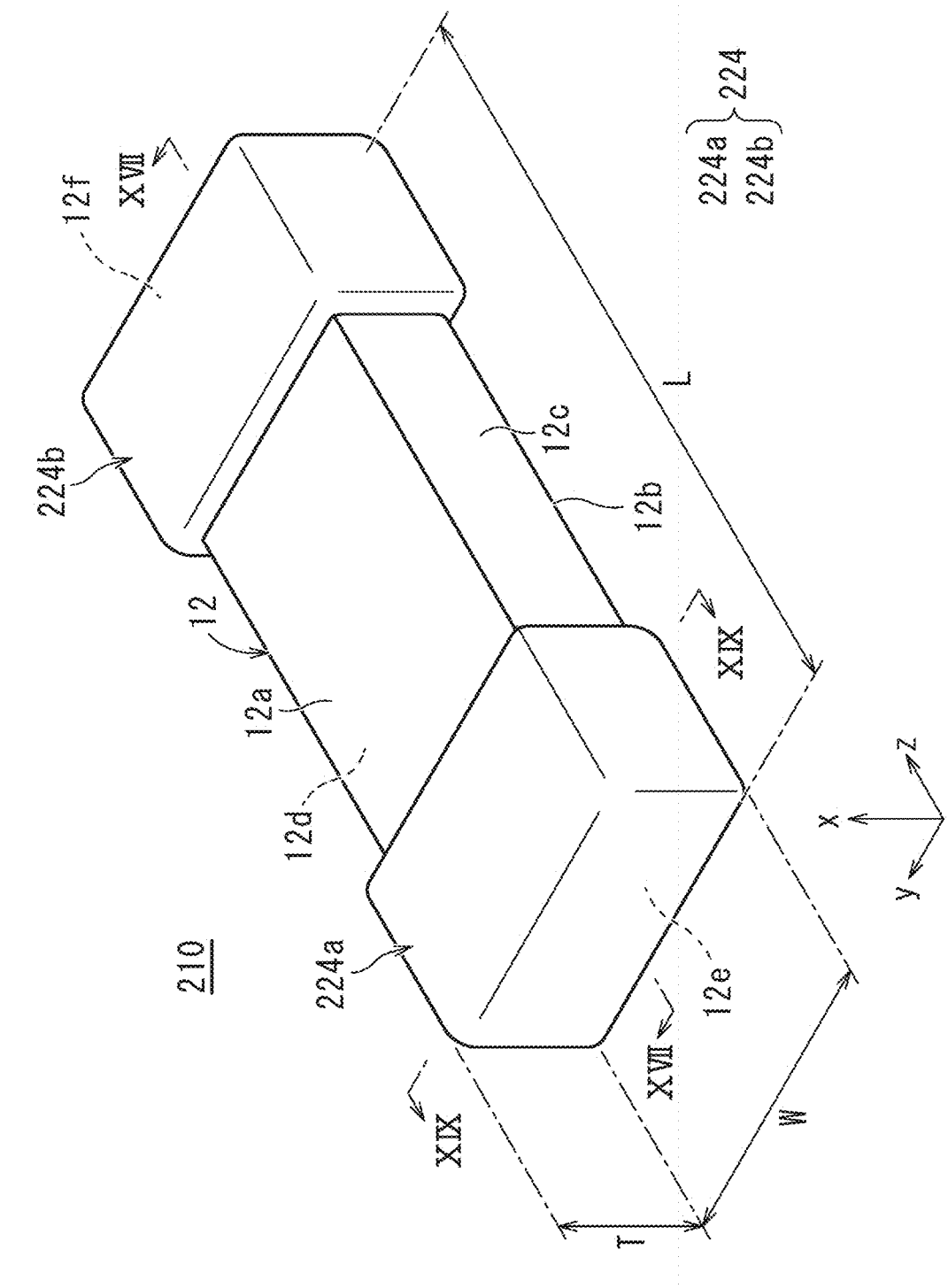
FIG. 14 is an external perspective view illustrating a multilayer ceramic capacitor as an example of a multilayer ceramic electronic component according to a third preferred embodiment of the present invention.
Figure 15:
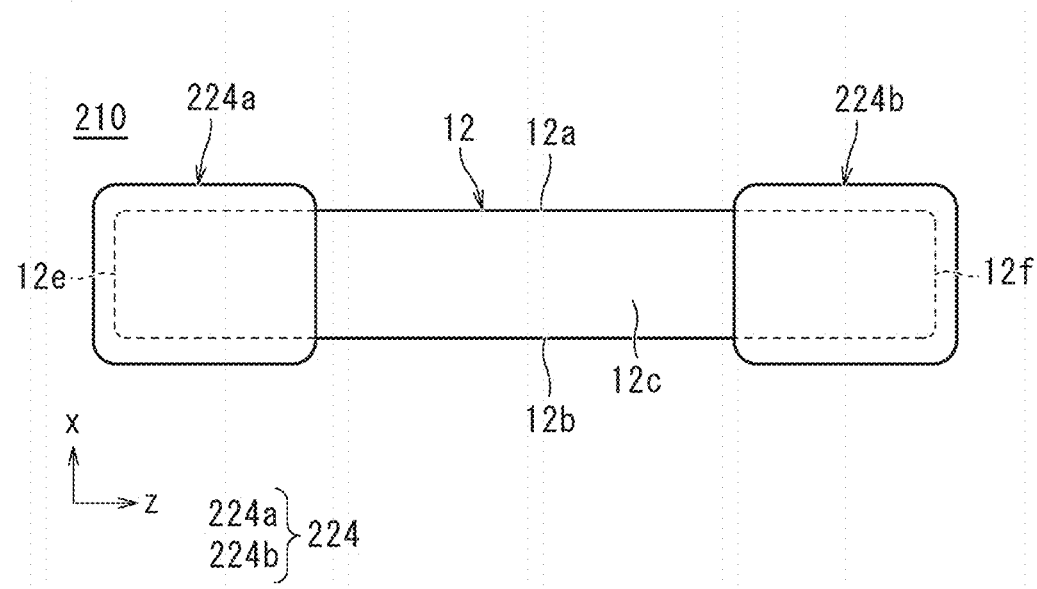
FIG. 15 is a front view illustrating the multilayer ceramic capacitor as an example of the multilayer ceramic electronic component according to the third preferred embodiment of the present invention.
Figure 16:
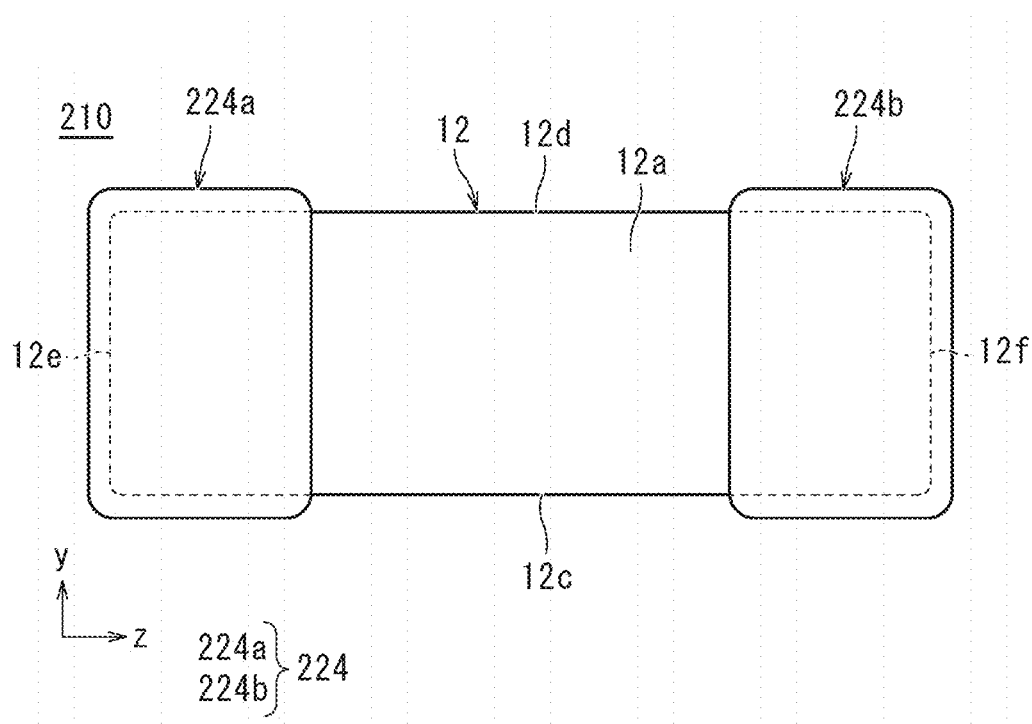
FIG. 16 is a top view illustrating the multilayer ceramic capacitor as an example of the multilayer ceramic electronic component according to the third preferred embodiment of the present invention.
Figure 17:
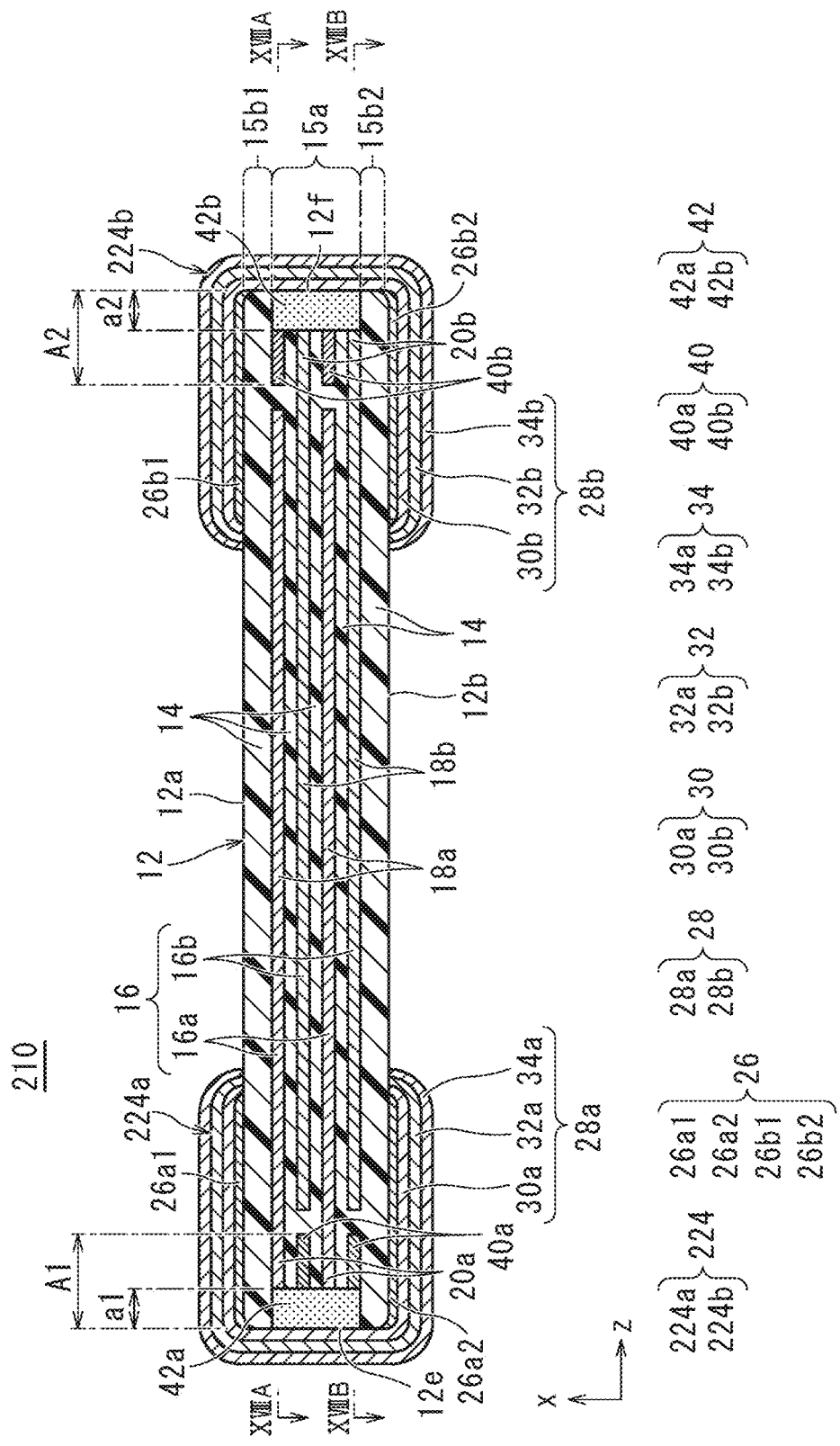
FIG. 17 is a cross-sectional view taken along line XVII-XVII in FIG. 14.
Figure 18A:
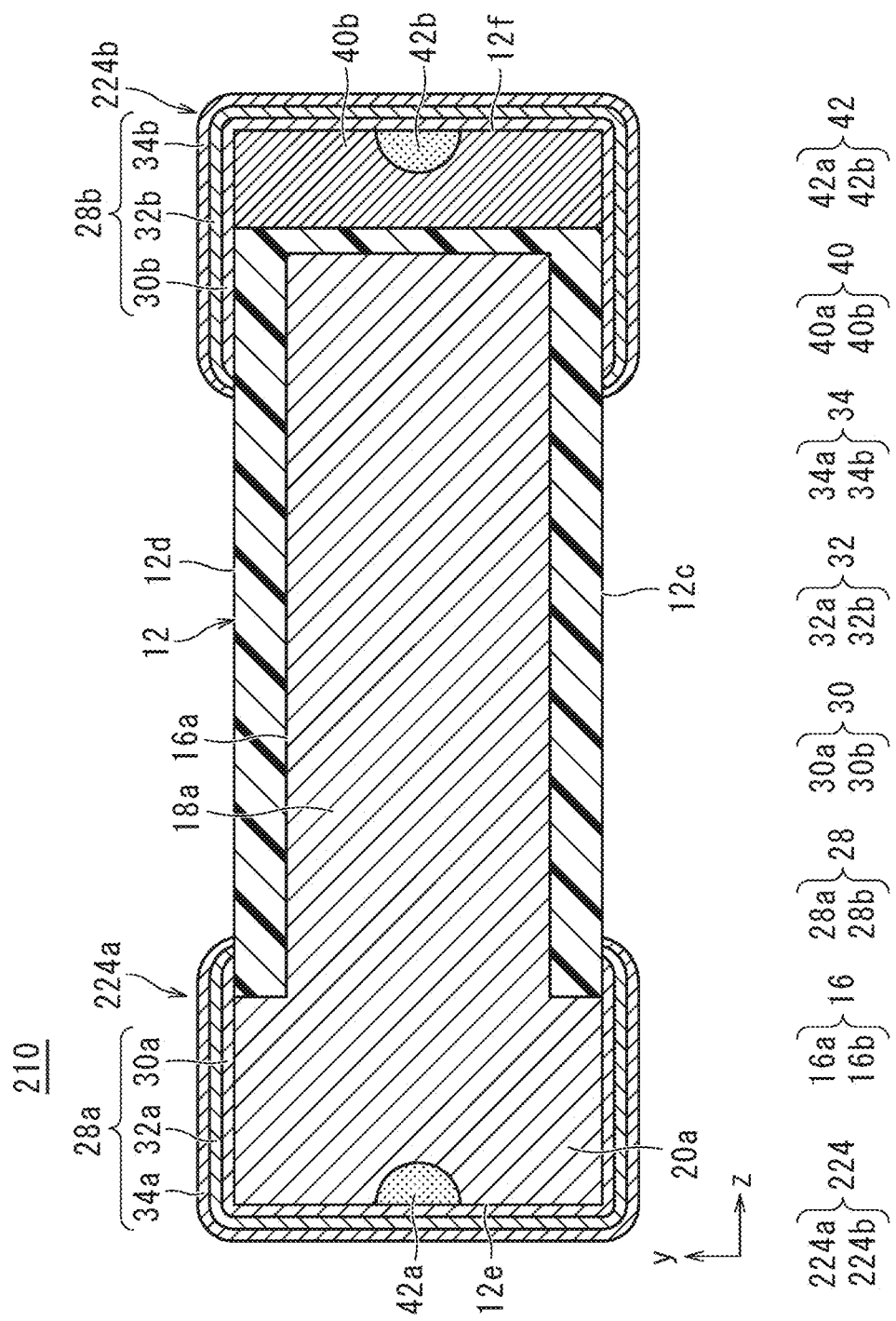
FIG. 18A is a cross-sectional view taken along line XVIIIA-XVIIIA in FIG. 17.
Figure 18B:
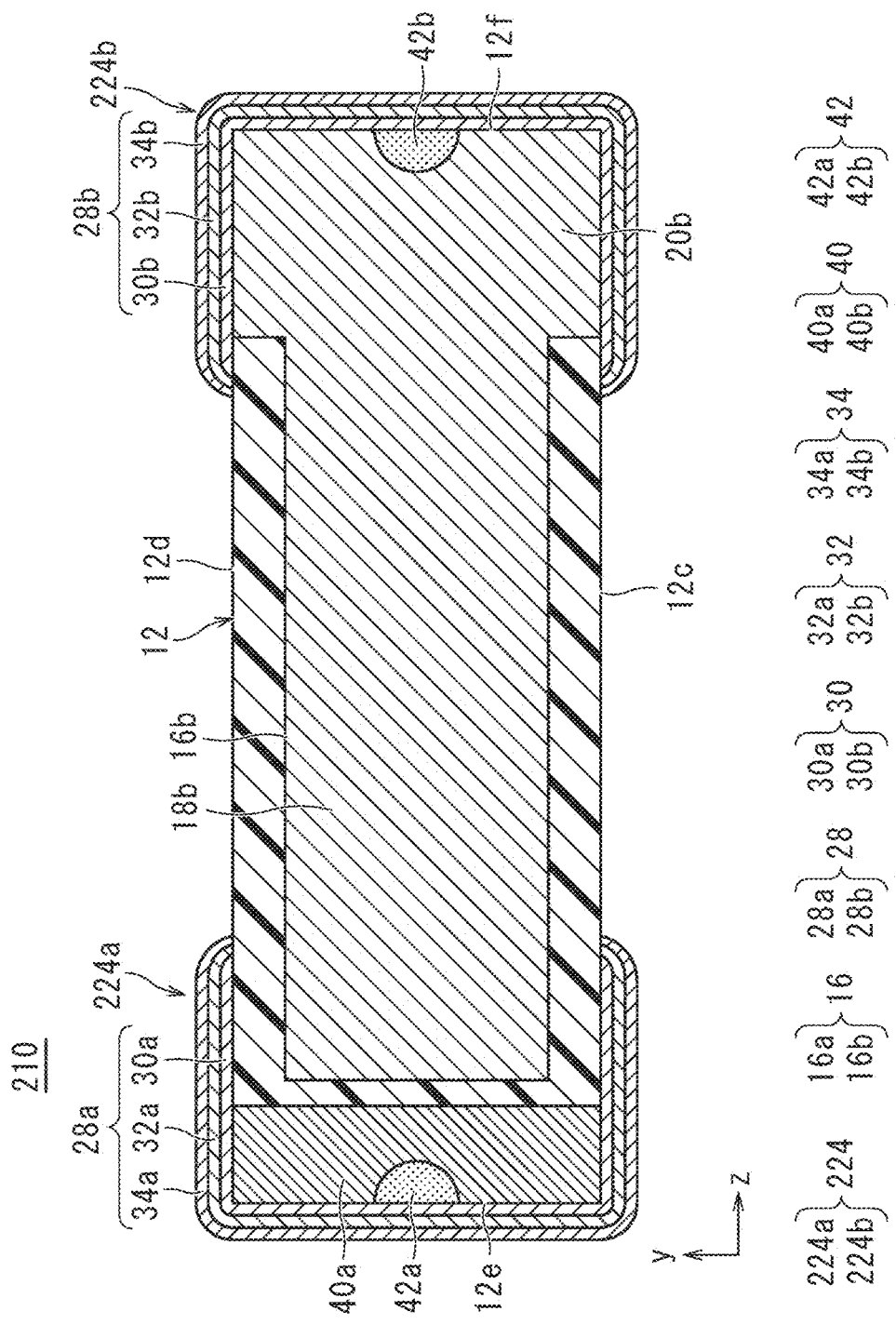
FIG. 18B is a cross-sectional view taken along line XVIIIB-XVIIIB in FIG. 17.
Figure 19:
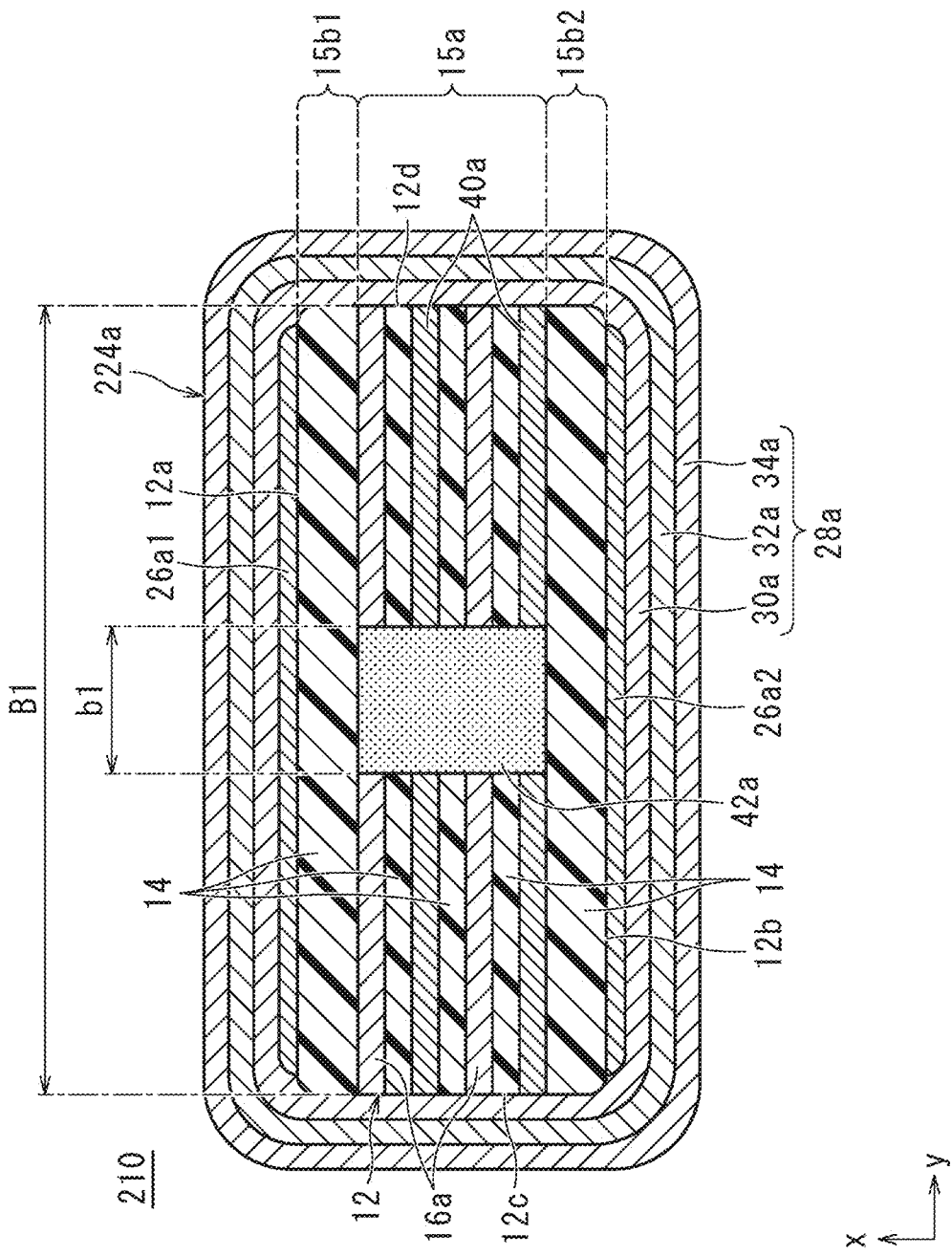
FIG. 19 is a cross-sectional view taken along line XIX-XIX in FIG. 14.

A multilayer ceramic capacitor 210 as an example of a multilayer ceramic electronic component according to the third preferred embodiment of the present invention will be described. FIG. 14 is an external perspective view illustrating the multilayer ceramic capacitor as an example of the multilayer ceramic electronic component according to the third preferred embodiment of the present invention. FIG. 15 is a front view illustrating the multilayer ceramic capacitor as an example of the multilayer ceramic electronic component according to the third preferred embodiment of the present invention. FIG. 16 is a top view illustrating the multilayer ceramic capacitor as an example of the multilayer ceramic electronic component according to the third preferred embodiment of the present invention. FIG. 17 is a cross-sectional view taken along line XVII-XVII in FIG. 14. FIG. 18A is a cross-sectional view taken along line XVIIIA-XVIIIA in FIG. 17. FIG. 18B is a cross-sectional view taken along line XVIIIB-XVIIIB in FIG. 17. FIG. 19 is a cross-sectional view taken along line XIX-XIX in FIG. 14.

In multilayer ceramic capacitor 210 according to the third preferred embodiment, an external electrode 224 is disposed not only on first end surface 12e, second end surface 12f, first principal surface 12a, and second principal surface 12b, but also on first lateral surface 12c and second lateral surface 12d as illustrated in FIG. 14. Further, the shape of an extended electrode portion of internal electrode layer 16 is also different as illustrated in FIGS. 18A and 18B. Therefore, components corresponding to the components of the first preferred embodiment are denoted by the same reference numerals, and the detailed description thereof will be omitted.

Internal electrode layer 16 includes first internal electrode layer 16a exposed to first end surface 12e and second internal electrode layer 16b exposed to second end surface 12f. First internal electrode layer 16a and second internal electrode layer 16b are alternately laminated with ceramic layers 14 interposed therebetween.

First internal electrode layer 16a is disposed on the surface of ceramic layer 14. First internal electrode layer 16a includes first counter electrode portion 18a facing second internal electrode layer 16b, and first extended electrode portion 20a extended from first counter electrode portion 18a to first end surface 12e. As illustrated in FIG. 18A, an end of first extended electrode portion 20a is extended to and exposed on first end surface 12e, a part of first lateral surface 12c, and a part of second lateral surface 12d.

Second internal electrode layer 16b is disposed on the surface of ceramic layer 14 different from ceramic layer 14 on which first internal electrode layer 16a is disposed. Second internal electrode layer 16b includes second counter electrode portion 18b facing first internal electrode layer 16a, and second extended electrode portion 20b extended from second counter electrode portion 18b to second end surface 12f. As illustrated in FIG. 18B, an end of second extended electrode portion 20b is extended to and exposed on second end surface 12f, a part of first lateral surface 12c, and a part of second lateral surface 12d.

External electrode 224 includes a plurality of external electrodes 224 connected to first internal electrode layer 16a and second internal electrode layer 16b. External electrode 224 includes at least a first external electrode 224a and a second external electrode 224b.

First external electrode 224a is disposed on multilayer body 12. More specifically, first external electrode 224a is disposed on the surface of first end surface 12e, a part of first principal surface 12a, a part of second principal surface 12b, a part of first lateral surface 12c, and a part of second lateral surface 12d of multilayer body 12. In this case, first external electrode 224a is electrically connected to first extended electrode portion 20a of first internal electrode layer 16a, first auxiliary electrode layer 40a, and first via conductor 42a.

Second external electrode 224b is disposed on multilayer body 12. More specifically, second external electrode 224b is disposed on the surface of second end surface 12f, a part of first principal surface 12a, a part of second principal surface 12b, a part of first lateral surface 12c, and a part of second lateral surface 12d of multilayer body 12. In this case, second external electrode 224b is electrically connected to second extended electrode portion 20b of second internal electrode layer 16b, second auxiliary electrode layer 40b, and second via conductor 42b.

Each of first external electrode 224a and second external electrode 224b preferably includes base electrode layer 26 and plating layer 28. The structures of base electrode layer 26 and plating layer 28 of multilayer ceramic capacitor 210 according to the present preferred embodiment are the same as the structures of base electrode layer 26 and plating layer 28 of multilayer ceramic capacitor 10 according to the first preferred embodiment.

With this configuration, plating layer 28 can also be formed on first extended electrode portion 20a and second extended electrode portion 20b exposed on first lateral surface 12c and second lateral surface 12d. As a result, external electrode 224 can be formed on first lateral surface 12c and second lateral surface 12d, and further, mountability with a mounting substrate can be improved.

Further, multilayer ceramic capacitor 210 according to the third preferred embodiment illustrated in FIG. 14 has the same effect as multilayer ceramic capacitor 10 according to the first preferred embodiment illustrated in FIG. 1.

D. Experimental Example

Experimental examples of the present invention will be described in detail below. The present experimental examples do not limit the present invention at all.

Experimental Example 1

A multilayer ceramic capacitor was prepared as a multilayer ceramic electronic component according to the above manufacturing method. The prepared multilayer ceramic capacitor was subjected to a deflection test, and an occurrence of cracks was checked.

1. Sample in Experimental Example 1

As an example of Experimental Example 1, a multilayer ceramic capacitor having the structure illustrated in FIG. 1 and the following specifications was prepared using the above manufacturing method.

Dimensions of multilayer ceramic capacitor: L×W×T=0.406 mm×0.208 mm×0.045 mm
Main component of material of ceramic layer: $BaTiO_3$
Materials of internal electrode layer and auxiliary electrode layer: Ni
Material of via conductor: Ni
Dimension of first via conductor in length direction: 30% of dimension of first auxiliary electrode layer in length direction
Dimension of second via conductor in length direction: 30% of dimension of second auxiliary electrode layer in length direction
Dimension of first via conductor in width direction: 30% of dimension of first auxiliary electrode layer in width direction
Dimension of second via conductor in width direction: 30% of dimension of second auxiliary electrode layer in width direction
Shapes of first via conductor and second via conductor: including a curved portion and a straight portion in plan view (in other words, a semicircular shape).
Structure of External Electrode
　○ Base electrode layer: Including metal film (thin film layer) formed by sputtering method
　　First layer: NiCr layer: 0.2 µm
　　Second layer: NiCu layer: 0.2 µm
　○ Plating layer: Including three layers of Cu plating layer+Ni plating layer+Sn plating layer from multilayer body side
　　Cu plating layer: 5 µm
　　Ni plating layer: 2.5 µm
　　Sn plating layer: 3.5 µm As a comparative example of Experimental Example 1, a multilayer ceramic capacitor not having a first auxiliary electrode layer, a second auxiliary electrode layer, a first via conductor, and a second via conductor was prepared. The comparative example was designed in the same manner as Experimental Example 1 except that the first auxiliary electrode layer, the second auxiliary electrode layer, the first via conductor, and the second via conductor were not formed.

2. Method for Evaluating Occurrence of Crack

First, a deflection test was performed. In the deflection test, the multilayer ceramic capacitor was mounted on a mounting substrate having a thickness of 1.6 mm using a solder paste, and then, mechanical stress was applied by bending the substrate with a push rod having a diameter of 5 µm from the back surface of the substrate on which the multilayer ceramic capacitor was not mounted. The holding time during the test was 60 seconds, and the bending amount was 8 mm. After the deflection test, the appearance of the multilayer ceramic capacitor was observed using a microscope, and cracks were counted. As a method for observing the appearance, first, the multilayer ceramic capacitor after the deflection test was cut out from the mounting substrate in a desired size together with the mounting substrate. Thereafter, the cut multilayer ceramic capacitor after the deflection test was solidified together with the substrate with a resin. Then, the multilayer ceramic capacitor was polished little by little from the lateral surface using an automatic polishing machine, and the polished cross section was observed each time to confirm an occurrence of cracks. The polishing amount was up to ½ of the W dimension of the multilayer ceramic capacitor. Regarding counting cracks, a crack formed in the first principal surface-side outer layer portion and the second principal surface-side outer layer portion, and a crack reaching the inner layer portion from the first principal surface-side outer layer portion and the second principal surface-side outer layer portion were both counted as cracks.

Table 1 shows the results of the above experiment.

TABLE 1

|  | Occurrence of crack |
| --- | --- |
| Example | 0/100 |
| Comparative Example | 20/100 |

In the multilayer ceramic capacitor according to the example, no crack was confirmed as a result of the deflection test. This is considered to be because, as compared with the multilayer ceramic capacitor according to the comparative example, the proportion of metal having higher hardness than the ceramic layer of the multilayer body could be increased in the multilayer ceramic capacitor due to the formation of the first auxiliary electrode layer and the second auxiliary electrode layer in the multilayer ceramic capacitor according to the example. It is considered that, as a result, the mechanical strength of the multilayer ceramic capacitor could be improved, and generation of cracks and flaws in the multilayer ceramic capacitor could be prevented. It is also considered that, as compared with the multilayer ceramic capacitor according to the comparative example, the proportion of metal having higher hardness than the ceramic layer of the multilayer body could be increased along the lamination direction also in the inner layer portion of the multilayer ceramic capacitor due to the formation of the first via conductor and the second conductor in the multilayer ceramic capacitor according to the example, and thus, the mechanical strength of the multilayer ceramic capacitor could be improved, and generation of cracks and flaws in the multilayer ceramic capacitor could be prevented.

Experimental Example 2

1. Sample in Experimental Example 2

Next, the dimension of the first via conductor in the width direction was fixed to 30% of the dimension of the first auxiliary electrode layer in the width direction, the dimension of the second via conductor in the width direction was fixed to 30% of the dimension of the second auxiliary electrode layer in the width direction, and the ratio (%) of the dimension of the first via conductor in the length direction to the dimension of the first auxiliary electrode layer in the length direction and the ratio (%) of the dimension of the second via conductor in the length direction to the dimension of the second auxiliary electrode layer in the length direction were changed. The samples were designed in the same manner as the example of Experimental Example 1 except for the above conditions. Table 2 shows the ratio (%) of the dimension of the first via conductor in the length direction to the dimension of the first auxiliary electrode layer in the length direction and the ratio (%) of the dimension of the second via conductor in the length direction to the dimension of the second auxiliary electrode layer in the length direction in the multilayer ceramic capacitors manufactured in Experimental Example 2.

2. Evaluation Method (1) Method for Evaluating Occurrence of Crack

The method for evaluating occurrence of cracks was the same as that in Experimental Example 1.

(2) Reliability Test

The reliability test was performed on each sample based on the PCBT test method. More specifically, first, each sample was mounted on a wiring substrate using LF solder. Subsequently, the insulation resistance value of each sample was measured. Next, the wiring substrate was placed in a high temperature and high humidity bath, and a direct current of 2 V was applied to each sample between the pair of external electrodes under an environment of 125° C. and a relative humidity of 95% RH. Each sample was maintained in this state for 72 hours. Subsequently, the insulation resistance value of each sample after the test was measured. Then, for each sample, the insulation resistance values before the moisture resistance test and after the test were compared. The sample in which the insulation resistance value did not decrease by two or more digits was determined as "○", and the sample in which the insulation resistance value decreased by four or more digits was determined as NG.

3. Experimental Results

Table 2 shows the results of the above experiment.

TABLE 2

| | Ratio (%) of dimension of first via conductor in length direction to dimension of first auxiliary electrode layer in length direction | Ratio (%) of dimension of second via conductor in length direction to dimension of second auxiliary electrode layer in length direction | Occurrence of crack | Reliability test |
|---|---|---|---|---|
| Sample No. 2-1 | 5 | 5 | 2/100 | 0/100 |
| Sample No. 2-2 | 10 | 10 | 0/100 | 0/100 |
| Sample No. 2-3 | 25 | 25 | 0/100 | 0/100 |
| Sample No. 2-4 | 50 | 50 | 0/100 | 0/100 |
| Sample No. 2-5 | 60 | 60 | 0/100 | 2/100 |

As shown in Table 2, it was confirmed that the samples in which the dimension of the first via conductor in the length direction was set to be greater than or equal to about 10% and less than or equal to about 50% of the dimension of the first auxiliary electrode layer in the length direction, and the dimension of the second via conductor in the length direction to be greater than or equal to about 10% and less than or equal to about 50% of the dimension of the second auxiliary electrode layer in the length direction had no cracks and were also good in the reliability test (sample Nos. 2-2, 2-3, and 2-4). This is considered to be because the proportion of metal having higher hardness than the ceramic layers of the multilayer body in the multilayer ceramic capacitor could be increased. As a result, it is considered that the mechanical strength of the multilayer ceramic capacitor could be improved, and generation of cracks and flaws in the multilayer ceramic capacitor could be effectively prevented. In addition, the sample in which the dimension of the first via conductor in the length direction was less than about 10% of the dimension of the first auxiliary electrode layer in the length direction, and the dimension of the second via conductor in the length direction was less than about 10% of the dimension of the second auxiliary electrode layer in the length direction had cracks (sample No. 2-1). This is considered to be because the proportion of metal having higher hardness than the ceramic layers of the multilayer body in the multilayer ceramic capacitor could not be sufficiently increased, and thus, the generation of cracks and flaws in the multilayer ceramic capacitor could not be sufficiently prevented. In addition, the sample in which the dimension of the first via conductor in the length direction was greater than about 50% of the dimension of the first auxiliary electrode layer in the length direction, and the dimension of the second via conductor in the length direction was greater about 50% of the dimension of the second auxiliary electrode layer in the length direction was poor in the reliability test (sample No. 2-5). This is considered to be because each of the distance between the first via conductor and the end of the second internal electrode layer facing the first via conductor and the distance between the second via conductor and the end of the first internal electrode layer facing the second via conductor was shortened, so that the risk of moisture intrusion was increased and the moisture resistance reliability was deteriorated.

Experimental Example 3

1. Sample in Experimental Example 3

Next, the ratio of the dimension of the first auxiliary electrode layer in the length direction to the dimension of the first via conductor in the length direction was fixed to about 40%, the ratio of the dimension of the second auxiliary electrode layer in the length direction to the dimension of the second via conductor in the length direction was fixed to about 40%, and the ratio (%) of the dimension of the first via conductor in the width direction to the dimension of the first auxiliary electrode layer in the width direction and the ratio (%) of the dimension of the second via conductor in the width direction to the dimension of the second auxiliary electrode layer in the width direction were changed. The samples were designed in the same manner as the example of Experimental Example 1 except for the above conditions. Table 3 shows the ratio (%) of the dimension of the first via conductor in the width direction to the dimension of the first auxiliary electrode layer in the width direction and the ratio (%) of the dimension of the second via conductor in the width direction to the dimension of the second auxiliary electrode layer in the width direction in the multilayer ceramic capacitors manufactured in Experimental Example 3.

2. Evaluation Method

The method for evaluating occurrence of cracks and the reliability test were performed in the same manner as in Experimental Example 2.

3. Experimental Results

Table 3 shows the results of the above experiment.

TABLE 3

| | Ratio (%) of dimension of first via conductor in width direction to dimension of first auxiliary electrode layer in width direction | Ratio (%) of dimension of second via conductor in width direction to dimension of second auxiliary electrode layer in width direction | Occurrence of crack | Reliability test |
|---|---|---|---|---|
| Sample No. 3-1 | 5 | 5 | 2/100 | 0/100 |
| Sample No. 3-2 | 10 | 10 | 0/100 | 0/100 |
| Sample No. 3-3 | 25 | 25 | 0/100 | 0/100 |
| Sample No. 3-4 | 50 | 50 | 0/100 | 0/100 |
| Sample No. 3-5 | 60 | 60 | 0/100 | 3/100 |

As shown in Table 3, it was confirmed that the samples in which the dimension of the first via conductor in the width direction was set to be greater than or equal to about 10% and less than or equal to about 50% of the dimension of the first auxiliary electrode layer in the width direction, and the dimension of the second via conductor in the width direction was set to be greater than or equal to about 10% and less than or equal to about 50% of the dimension of the second auxiliary electrode layer in the width direction had no cracks and were also good in the reliability test (sample Nos. 3-2, 3-3, and 3-4). This is considered to be because the proportion of metal having higher hardness than the ceramic layers of the multilayer body in the multilayer ceramic capacitor could be increased. As a result, it is considered that the mechanical strength of the multilayer ceramic capacitor could be improved, and generation of cracks and flaws in the multilayer ceramic capacitor could be effectively prevented. In addition, the sample in which the dimension of the first via conductor in the width direction was less than about 10% of the dimension of the first auxiliary electrode layer in the width direction, and the dimension of the second via conductor in the width direction was less than about 10% of the dimension of the second auxiliary electrode layer in the width direction had cracks (sample No. 3-1). This is considered to be because the proportion of metal having higher hardness than the ceramic layers of the multilayer body in the multilayer ceramic capacitor could not be sufficiently increased, and thus, the generation of cracks and flaws in the multilayer ceramic capacitor could not be sufficiently prevented. In addition, the sample in which the dimension of the first via conductor in the width direction was greater than about 50% of the dimension of the first auxiliary electrode layer in the width direction, and the dimension of the second via conductor in the width direction was greater than 50% of the dimension of the second auxiliary electrode layer in the width direction was poor in the reliability test (sample No. 3-5). This is considered to be because each of the distance between the first via conductor and each of the first lateral surface side end and the second lateral surface side end of the external electrode disposed on the first end surface, and the distance between the second via conductor and each of the first lateral surface side end and the second lateral side end of the external electrode disposed on the second end surface was shortened, so that the risk of moisture intrusion was increased and the moisture resistance reliability was deteriorated.

While the preferred embodiments of the present invention are set forth in the above description as described above, the present invention is not limited thereto.

That is, various changes can be made with respect to the mechanism, the shape, the material, the quantity, the position, the arrangement, and the like of the preferred embodiments and each modification described above without departing from the scope of the technical ideas of the preferred embodiments and modifications thereof of the present invention, and these changes are included in the present invention.

Supplementary Matter 1

A multilayer ceramic electronic component includes a multilayer body including a plurality of ceramic layers that are laminated and a plurality of internal electrode layers laminated on the ceramic layers, the multilayer body including a first principal surface and a second principal surface facing each other in a lamination direction, a first lateral surface and a second lateral surface facing each other in a width direction orthogonal to the lamination direction, and a first end surface and a second end surface facing each other in a length direction orthogonal to the lamination direction and the width direction, and a plurality of external electrodes connected to the internal electrode layers, in which the multilayer body includes an inner layer portion including a region from an internal electrode layer closest to the first principal surface among the plurality of internal electrode layers to an internal electrode layer closest to the second principal surface among the plurality of internal electrode layers, the plurality of internal electrode layers facing each other with the ceramic layers interposed therebetween in the lamination direction, a first principal surface-side outer layer portion including the plurality of ceramic layers located between the first principal surface and the internal electrode layer located closest to the first principal surface among the plurality of internal electrode layers, and a second principal surface-side outer layer portion including the plurality of ceramic layers located between the second principal surface and the internal electrode layer located closest to the second principal surface among the plurality of internal electrode layers, the internal electrode layers include a first internal electrode layer exposed to the first end surface, and a second internal electrode layer exposed to the second end surface, a first auxiliary electrode layer spaced away from the second internal electrode layer and exposed to the first end surface is on a same plane as the ceramic layer on which the second internal electrode layer is located, a second auxiliary electrode layer spaced away from the first internal electrode layer and exposed to the second end surface is on a same plane as the ceramic layer on which the first internal electrode layer is located, a first via conductor is at a central portion in the width direction of the first internal electrode layer and the first auxiliary electrode layer so as to be exposed to the first end surface, and a second via conductor is at a central portion in the width direction of the second internal electrode layer and the second auxiliary electrode layer so as to be exposed to the second end surface.

Supplementary Matter 2

In the multilayer ceramic electronic component according to Supplementary matter 1, the first via conductor extends continuously from a side of the inner layer portion closest to the first principal surface to a side of the inner layer portion closest to the second principal surface, and the second via conductor extends continuously from the side of the inner layer portion closest to the first principal surface to the side of the inner layer portion closest to the second principal surface.

Supplementary Matter 3

In the multilayer ceramic electronic component according to Supplementary matter 1 or Supplementary matter 2, the first via conductor has a dimension in the length direction that is greater than or equal to about 10% and less than or equal to about 50% of a dimension in the length direction of the first auxiliary electrode layer.

Supplementary Matter 4

In the multilayer ceramic electronic component according to any one of Supplementary matter 1 to Supplementary matter 3, the second via conductor has a dimension in the length direction that is greater than or equal to about 10% and less than or equal to about 50% of a dimension in the length direction of the second auxiliary electrode layer.

Supplementary Matter 5

In the multilayer ceramic electronic component according to any one of Supplementary matter 1 to Supplementary matter 4, the first via conductor has a dimension in the width direction that is greater than or equal to about 10% and less than or equal to about 50% of a dimension in the width direction of the first auxiliary electrode layer.

Supplementary Matter 6

In the multilayer ceramic electronic component according to any one of Supplementary matter 1 to Supplementary matter 5, the second via conductor has a dimension in the width direction that is greater than or equal to about 10% and less than or equal to about 50% of a dimension in the width direction of the second auxiliary electrode layer.

Supplementary Matter 7

In the multilayer ceramic electronic component according to any one of Supplementary matter 1 to Supplementary matter 6, each of the first via conductor and the second via conductor includes a curved portion and a straight portion when viewed in the lamination direction.

Supplementary Matter 8

In the multilayer ceramic electronic component according to any one of Supplementary matter 1 to Supplementary matter 7, the plurality of external electrodes include a thin film electrode on the multilayer body and including at least one selected from Mg, Al, Ti, W, Cr, Cu, Ni, Ag, Co, Mo, and V, a Cu plating layer on the thin film electrode, an Ni plating layer on the Cu plating layer, or an Sn plating layer on the Ni plating layer.

Supplementary Matter 9

In the multilayer ceramic electronic component according to any one of Supplementary matter 1 to Supplementary matter 8, the multilayer ceramic electronic component has a thickness dimension less than or equal to about 150 μm in the lamination direction.

Supplementary Matter 10

In the multilayer ceramic electronic component according to any one of Supplementary matter 1 to Supplementary matter 9, the multilayer ceramic electronic component has a thickness dimension less than or equal to about 80 μm in the lamination direction.

Preferred embodiments of the present invention and modifications thereof relate to multilayer ceramic electronic components, and can be used particularly as a low-profile multilayer ceramic electronic component with improved mechanical strength.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic electronic component comprising:
   a multilayer body including a plurality of ceramic layers that are laminated and a plurality of internal electrode layers laminated on the ceramic layers, the multilayer body including a first principal surface and a second principal surface facing each other in a lamination direction, a first lateral surface and a second lateral surface facing each other in a width direction orthogo- nal to the lamination direction, and a first end surface and a second end surface facing each other in a length direction orthogonal to the lamination direction and the width direction; and a plurality of external electrodes connected to the internal electrode layers; wherein the multilayer body includes:

an inner layer portion including a region from an internal electrode layer closest to the first principal surface among the plurality of internal electrode layers to an internal electrode layer closest to the second principal surface among the plurality of internal electrode layers, the plurality of internal electrode layers facing each other with the ceramic layers interposed therebetween in the lamination direction;

a first principal surface-side outer layer portion including the plurality of ceramic layers between the first principal surface and the internal electrode layer closest to the first principal surface among the plurality of internal electrode layers; and a second principal surface-side outer layer portion including the plurality of ceramic layers between the second principal surface and the internal electrode layer closest to the second principal surface among the plurality of internal electrode layers;

the internal electrode layers include:

a first internal electrode layer exposed to the first end surface, and a second internal electrode layer exposed to the second end surface;

a first auxiliary electrode layer spaced away from the second internal electrode layer and exposed to the first end surface is on a same plane as the ceramic layer on which the second internal electrode layer is located; and a second auxiliary electrode layer spaced away from the first internal electrode layer and exposed to the second end surface is on a same plane as the ceramic layer on which the first internal electrode layer is located;

a first via conductor is located at a central portion in the width direction of the first internal electrode layer and the first auxiliary electrode layer so as to be exposed to the first end surface;

a second via conductor is located at a central portion in the width direction of the second internal electrode layer and the second auxiliary electrode layer so as to be exposed to the second end surface; and the first via conductor is not exposed to the first principal surface and the second principal surface, and the second via conductor is not exposed to the first principal surface and the second principal surface.

2. The multilayer ceramic electronic component according to claim 1, wherein the first via conductor extends continuously from a side of the inner layer portion closest to the first principal surface to a side of the inner layer portion closest to the second principal surface; and the second via conductor extends continuously from the side of the inner layer portion closest to the first principal surface to the side of the inner layer portion closest to the second principal surface.

3. The multilayer ceramic electronic component according to claim 1, wherein the first via conductor has a dimension in the length direction that is greater than or equal to about 10% and less than or equal to about 50% of a dimension in the length direction of the first auxiliary electrode layer.

4. The multilayer ceramic electronic component according to claim 1, wherein the second via conductor has a dimension in the length direction that is greater than or equal to about 10% and less than or equal to about 50% of a dimension in the length direction of the second auxiliary electrode layer.

5. The multilayer ceramic electronic component according to claim 1, wherein the first via conductor has a dimension in the width direction that is greater than or equal to about 10% and less than or equal to about 50% of a dimension in the width direction of the first auxiliary electrode layer.

6. The multilayer ceramic electronic component according to claim 1, wherein the second via conductor has a dimension in the width direction that is greater than or equal to about 10% and less than or equal to about 50% of a dimension in the width direction of the second auxiliary electrode layer.

7. The multilayer ceramic electronic component according to claim 1, wherein each of the first via conductor and the second via conductor includes a curved portion and a straight portion when viewed in the lamination direction.

8. The multilayer ceramic electronic component according to claim 1, wherein the plurality of external electrodes include a thin film electrode on the multilayer body and including at least one selected from Mg, Al, Ti, W, Cr, Cu, Ni, Ag, Co, Mo, and V, a Cu plating layer on the thin film electrode, an Ni plating layer on the Cu plating layer, or an Sn plating layer on the Ni plating layer.

9. The multilayer ceramic electronic component according to claim 1, wherein the multilayer ceramic electronic component has a thickness dimension less than or equal to about 150 μm in the lamination direction.

10. The multilayer ceramic electronic component according to claim 1, wherein the multilayer ceramic electronic component has a thickness dimension less than or equal about to about 80 μm in the lamination direction.

11. The multilayer ceramic electronic component according to claim 1, wherein a dimension in the length direction of the multilayer ceramic electronic component is greater than or equal to about 0.2 mm and less than or equal to about 10 mm;

a dimension in the width direction of the multilayer ceramic electronic component is greater than or equal to about 0.1 mm and less than or equal to about 10 mm; and a dimension in the lamination direction of the multilayer ceramic electronic component is less than or equal to about 150 μm.

12. The multilayer ceramic electronic component according to claim 11, wherein the dimension in the lamination direction of the multilayer ceramic electronic component is less than or equal to about 80 μm.

13. The multilayer ceramic electronic component according to claim 1, wherein each of the ceramic layers includes at least one of $BaTiO_3$, $CaTiO_3$, $SrTiO_3$, or $CaZnO_3$ as a main component, and at least one of a Mn compound, an Fe compound, a Cr compound, a Co compound, or a Ni compound as an accessory component.

14. The multilayer ceramic electronic component according to claim 1, wherein the multilayer ceramic electronic component is a multilayer ceramic capacitor.

15. The multilayer ceramic electronic component according to claim 1, wherein the multilayer ceramic electronic component is a ceramic piezoelectric element.

16. The multilayer ceramic electronic component according to claim 1, wherein the multilayer ceramic electronic component is a thermistor element.

17. The multilayer ceramic electronic component according to claim 1, wherein the multilayer ceramic electronic component is an inductor element.

18. The multilayer ceramic electronic component according to claim 1, wherein a thickness of each of the first auxiliary electrode layer and the second auxiliary electrode layer is equal to or greater than about 0.2 μm and equal to or less than about 2.0 μm.

19. The multilayer ceramic electronic component according to claim 1, wherein the first via conductor and the second via conductor include at least one of Ni, Cu, Ag, Pd, or Au, or an alloy including at least one of Ni, Cu, Ag, Pd, or Au.

20. The multilayer ceramic electronic component according to claim 1, wherein no gap exists between the first internal electrode layer and the first auxiliary electrode layer and the first via conductor, and between the second internal electrode layer and the second auxiliary electrode layer and the second via conductor.

* * * * *